Figure 5:
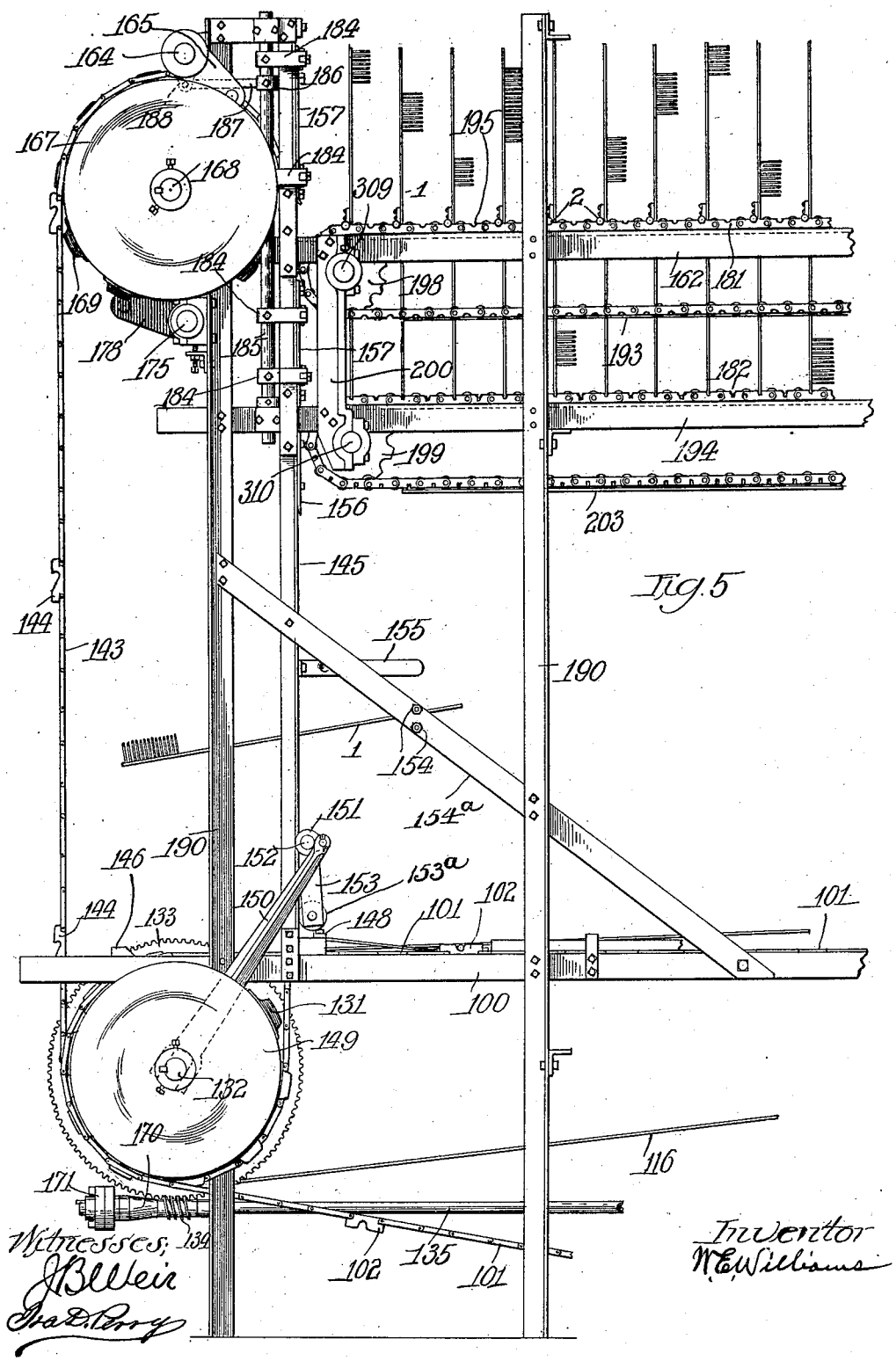

No. 876,921.
PATENTED JAN. 14, 1908.
W. E. WILLIAMS.
MATCH MACHINE.
APPLICATION FILED JUNE 13, 1903.
21 SHEETS—SHEET 1.
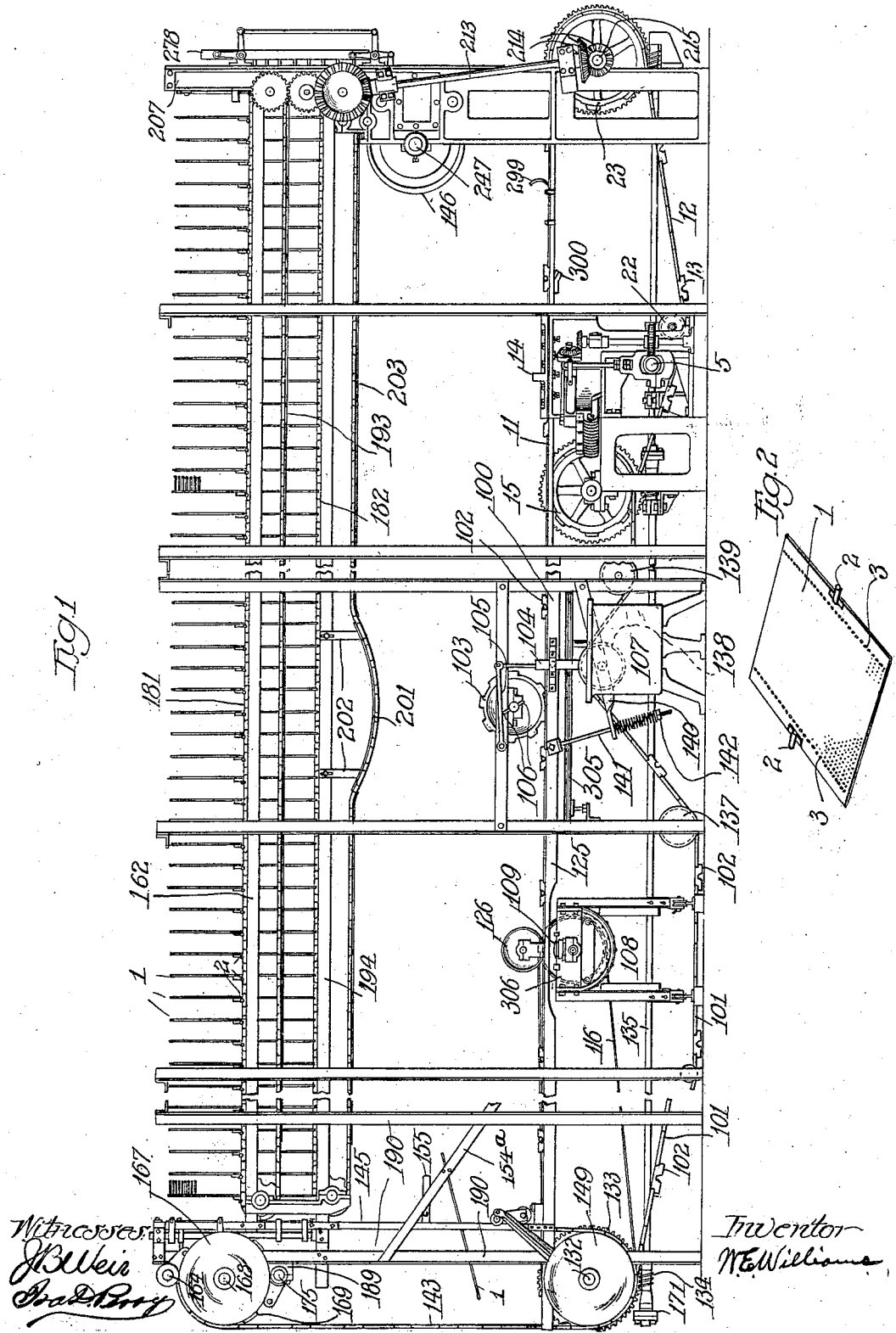

No. 876,921. PATENTED JAN. 14, 1908.
W. E. WILLIAMS.
MATCH MACHINE.
APPLICATION FILED JUNE 13, 1903.
21 SHEETS—SHEET 2.
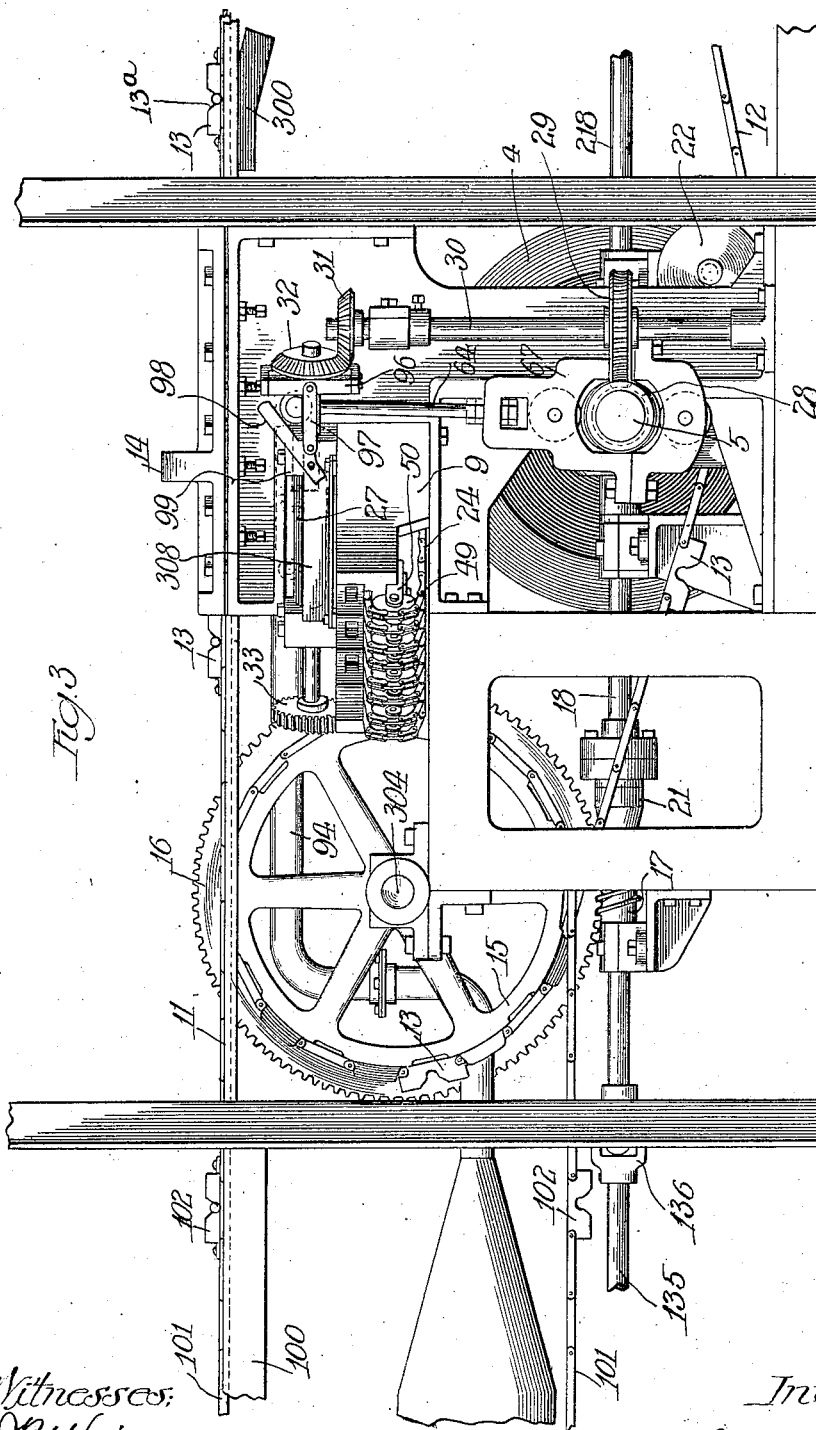
Witnesses:
JB Weir
Ira D Perry
Inventor
W E Williams

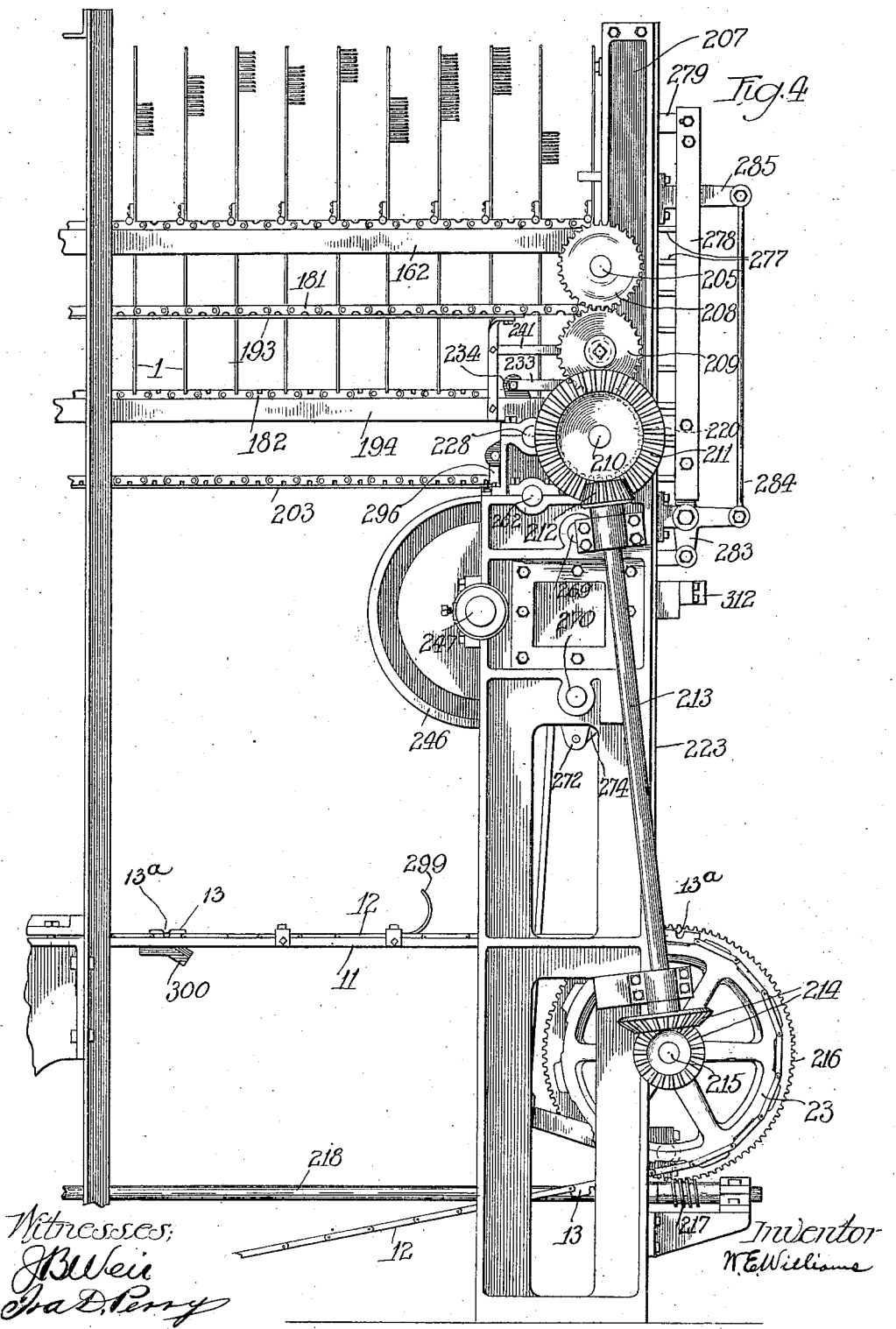

No. 876,921.

PATENTED JAN. 14, 1908.

W. E. WILLIAMS.
MATCH MACHINE.
APPLICATION FILED JUNE 13, 1903.

21 SHEETS—SHEET 4.

Witnesses:
J. B. Weir
Ira D. Perry

Inventor
W. E. Williams

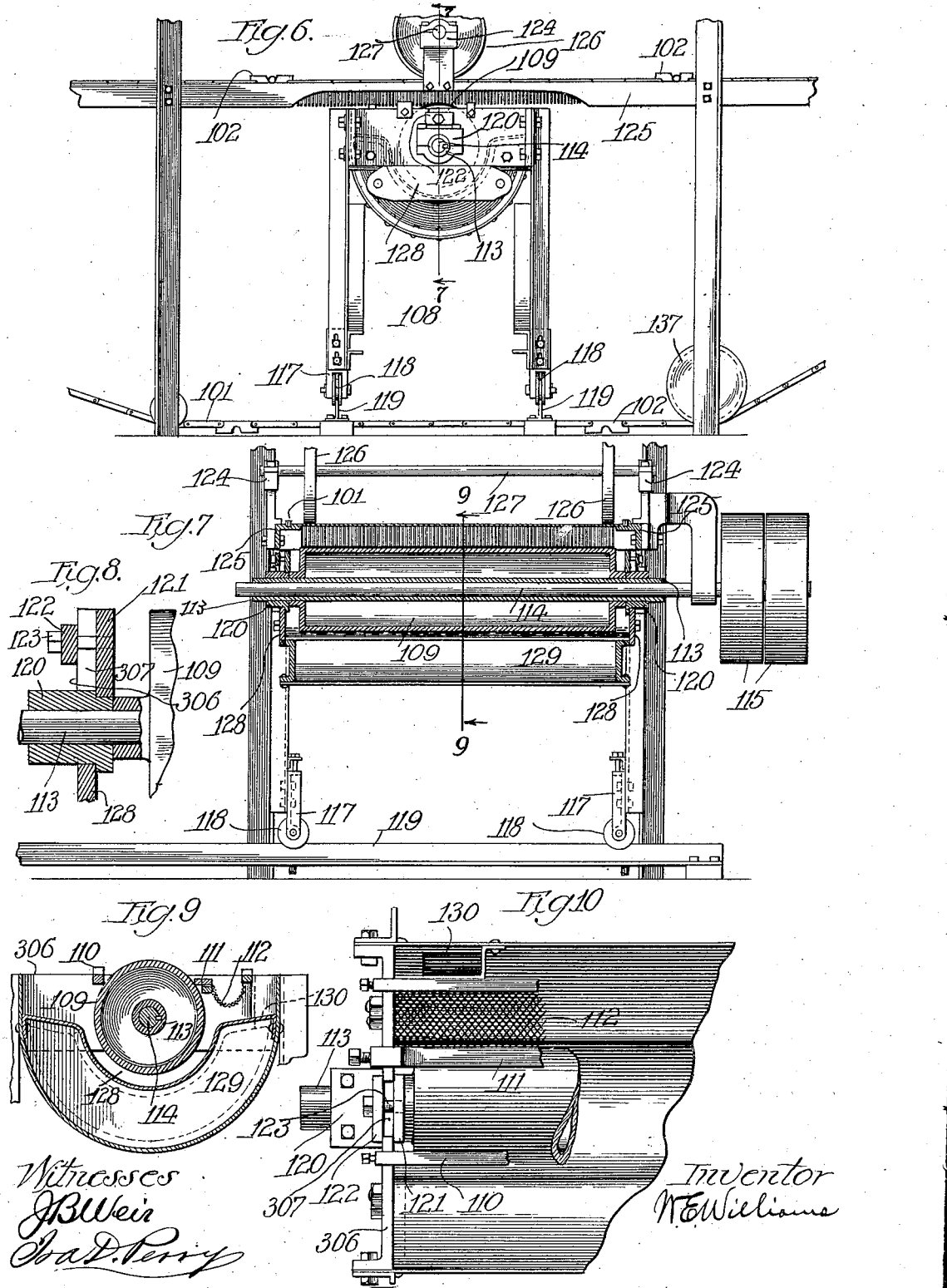

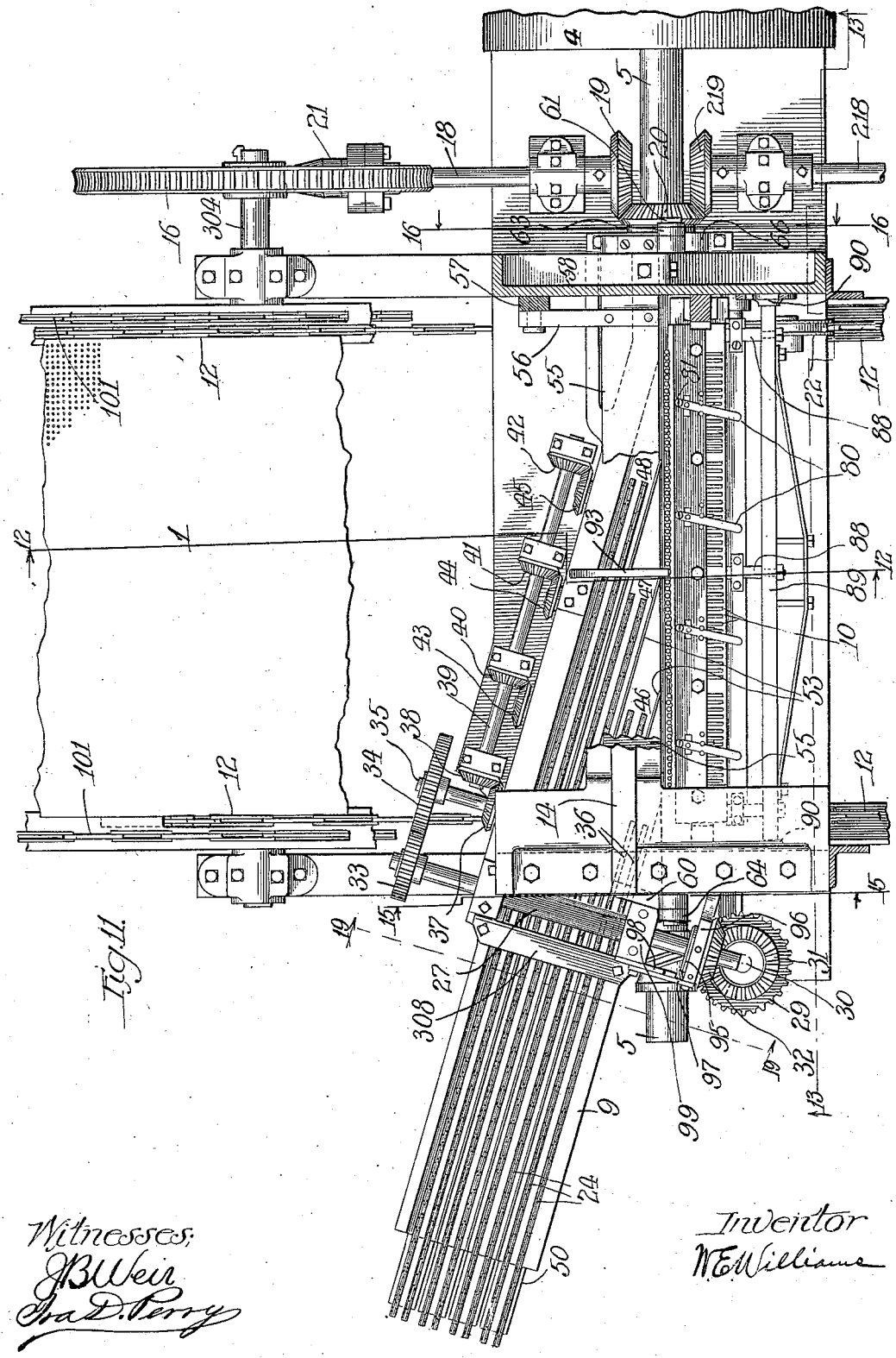

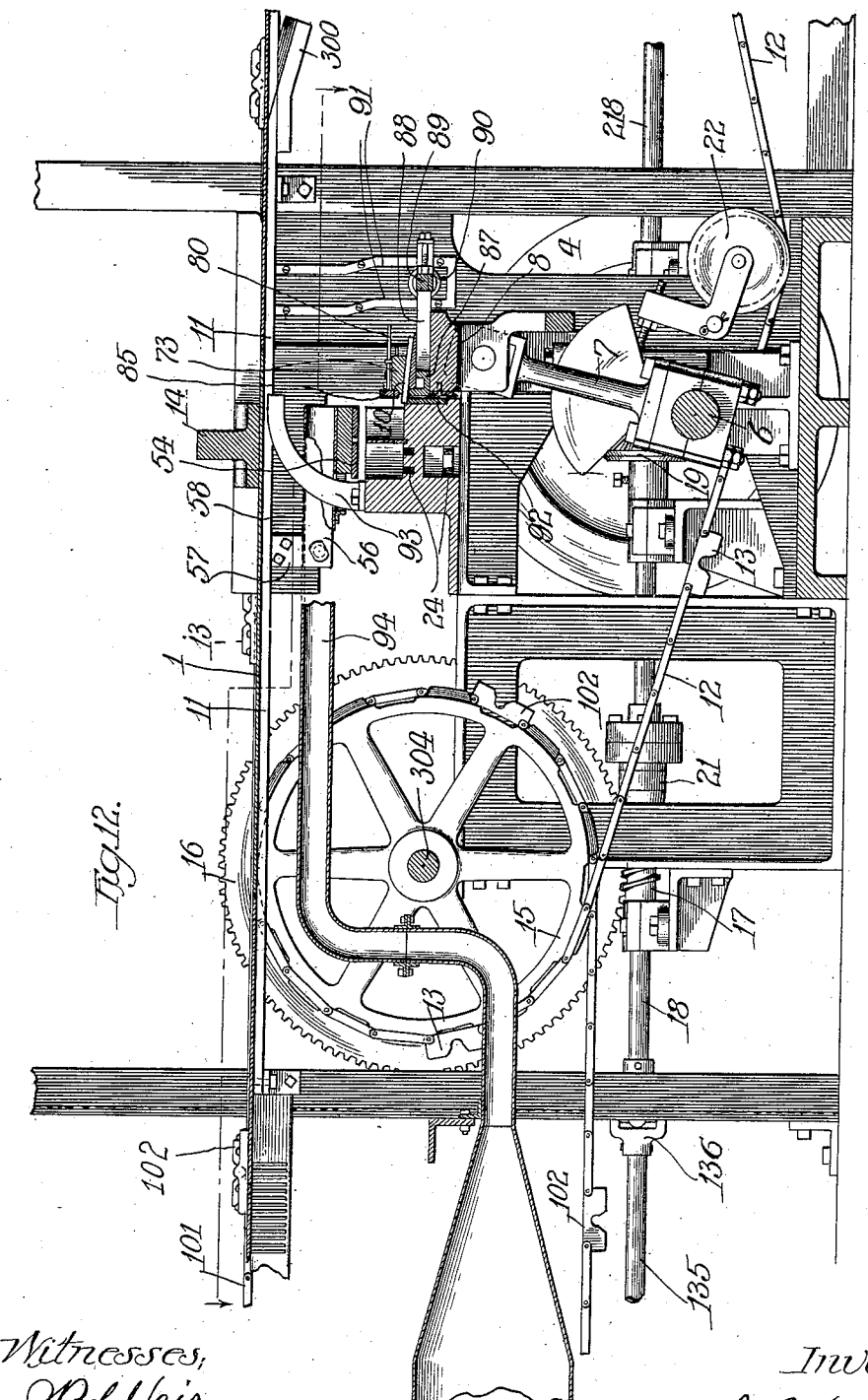

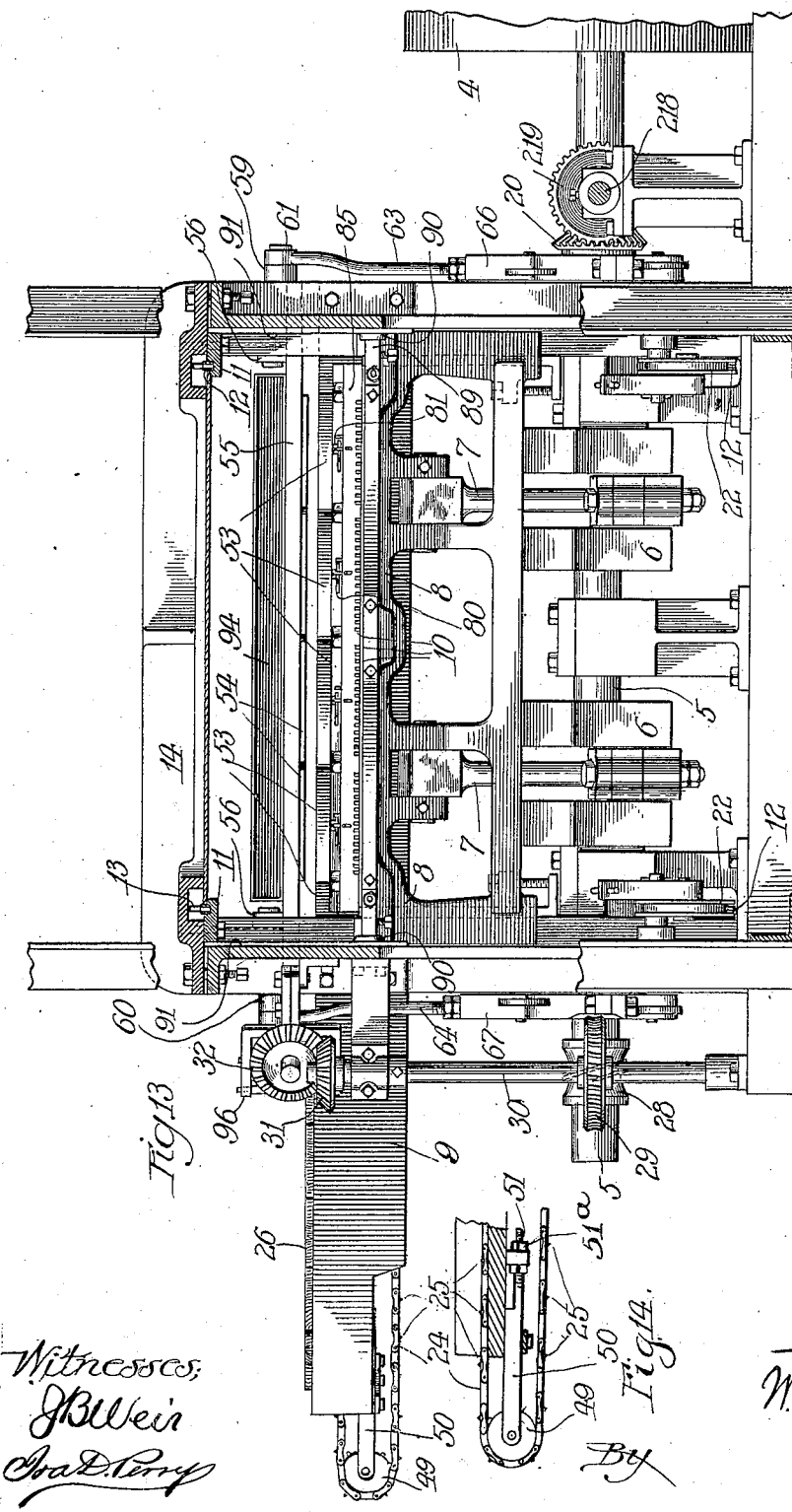

No. 876,921. PATENTED JAN. 14, 1908.
W. E. WILLIAMS.
MATCH MACHINE.
APPLICATION FILED JUNE 13, 1903.
21 SHEETS—SHEET 9.
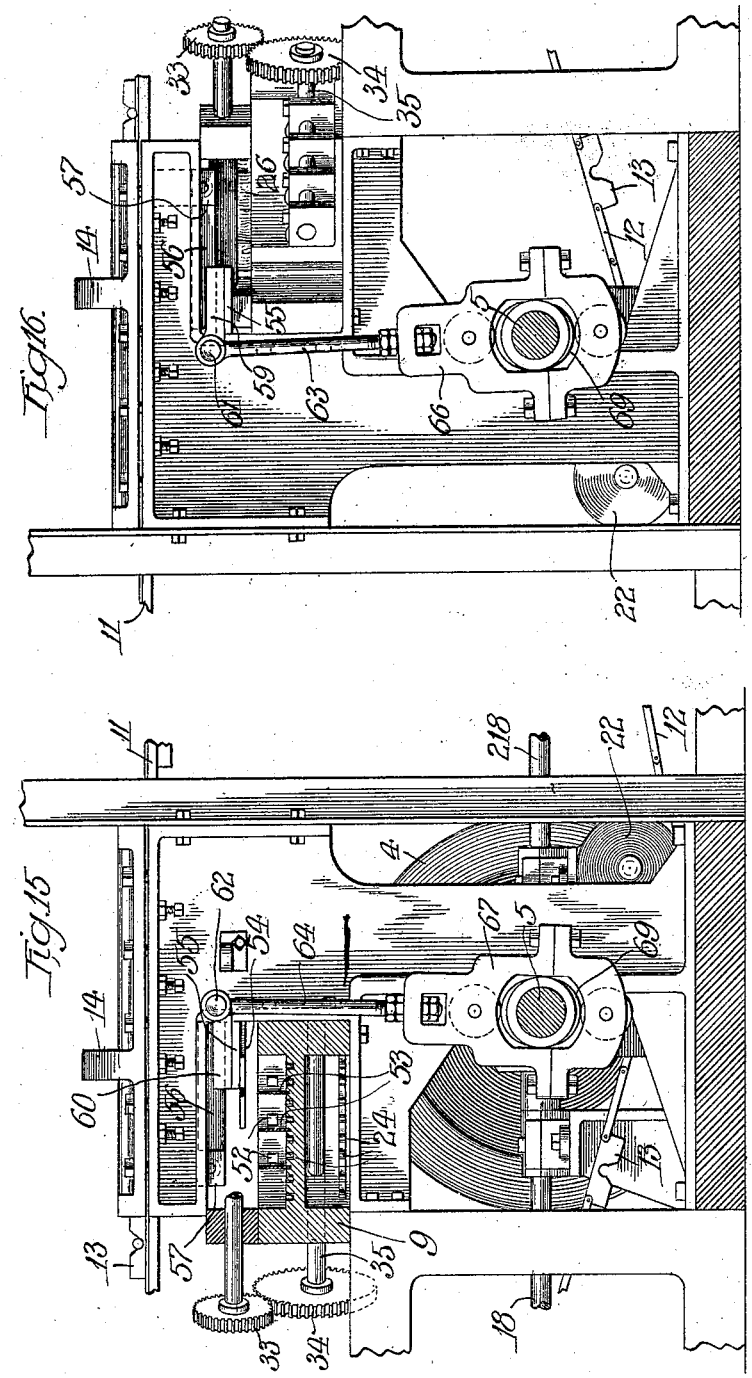
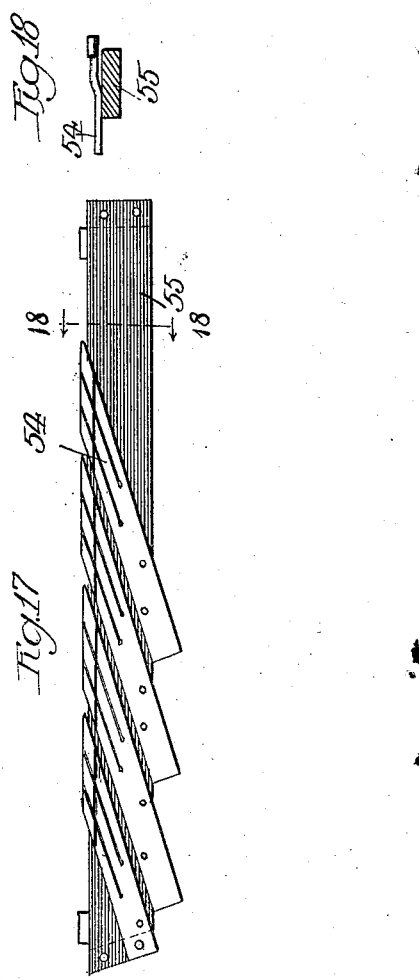
Witnesses:
Inventor
W. E. Williams

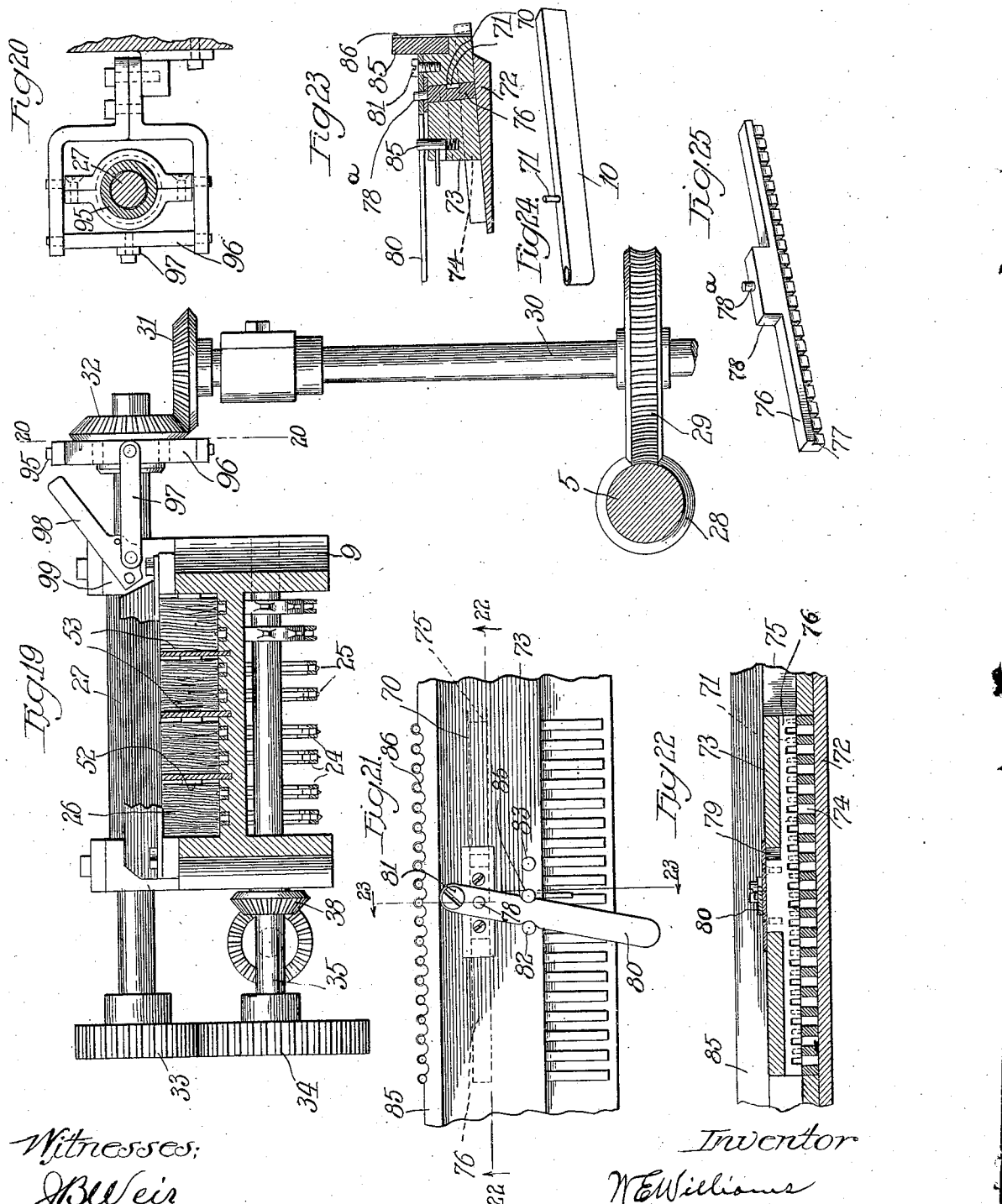

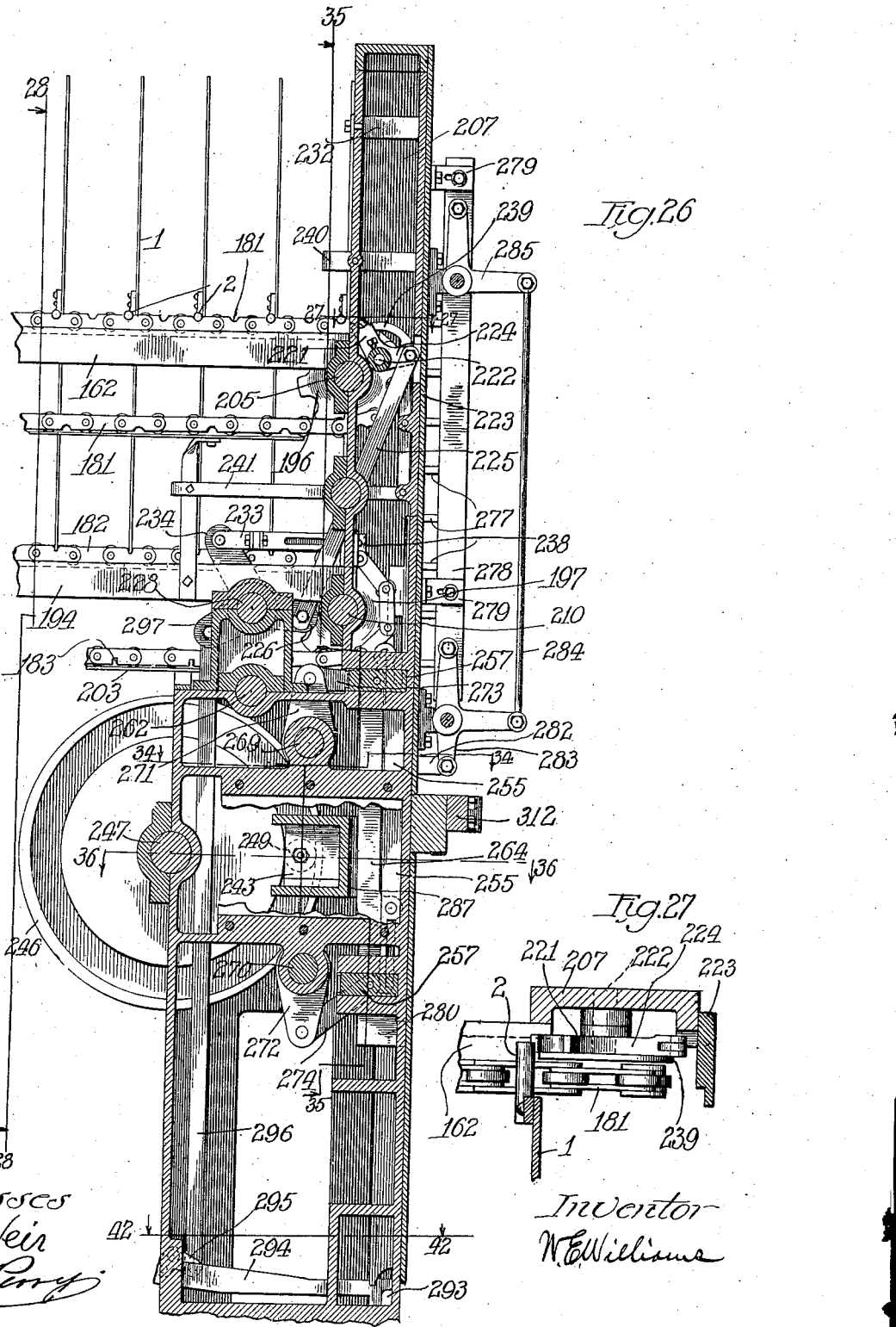

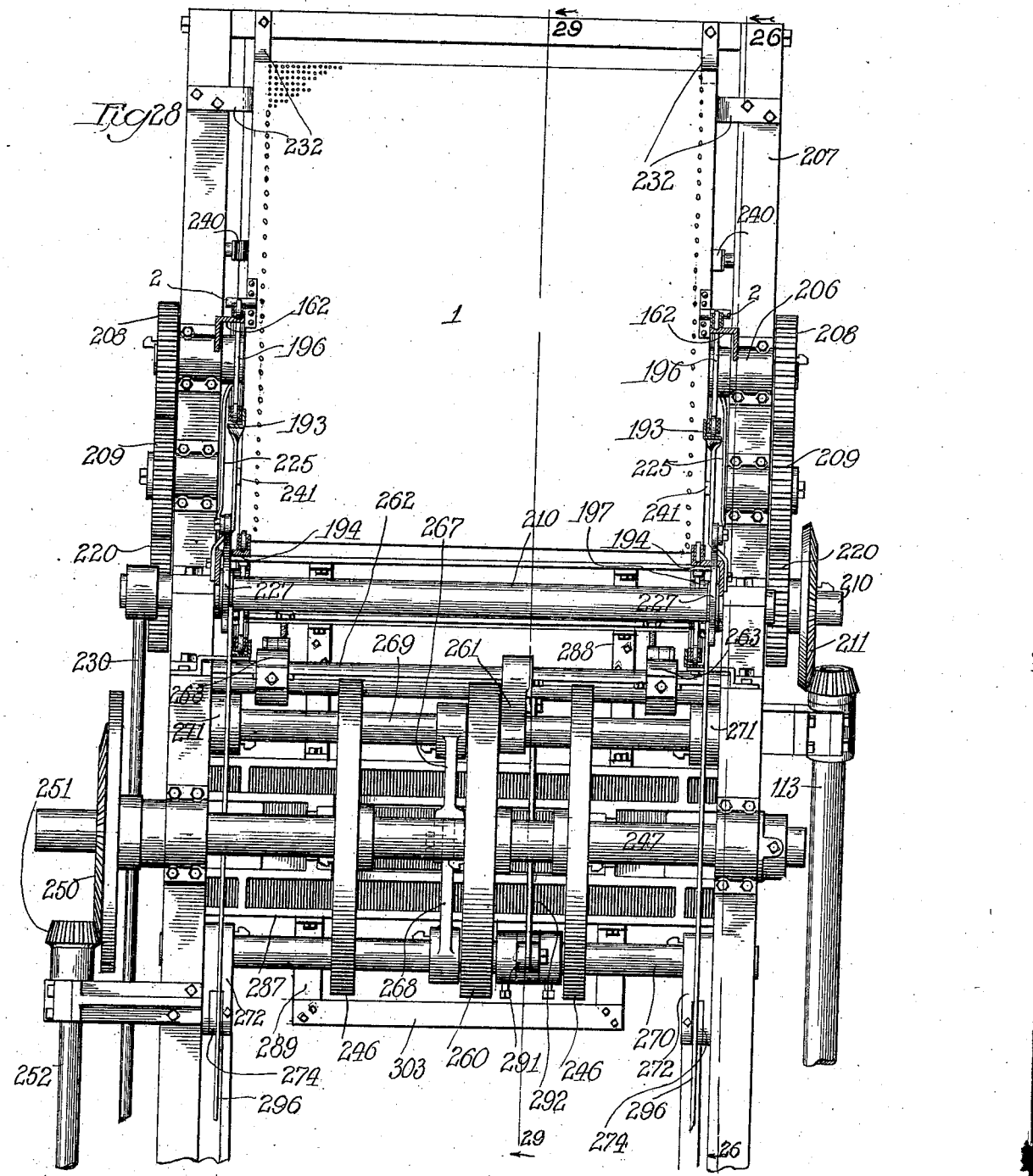

No. 876,921.
PATENTED JAN. 14, 1908.
W. E. WILLIAMS.
MATCH MACHINE.
APPLICATION FILED JUNE 13, 1903.
21 SHEETS—SHEET 13.
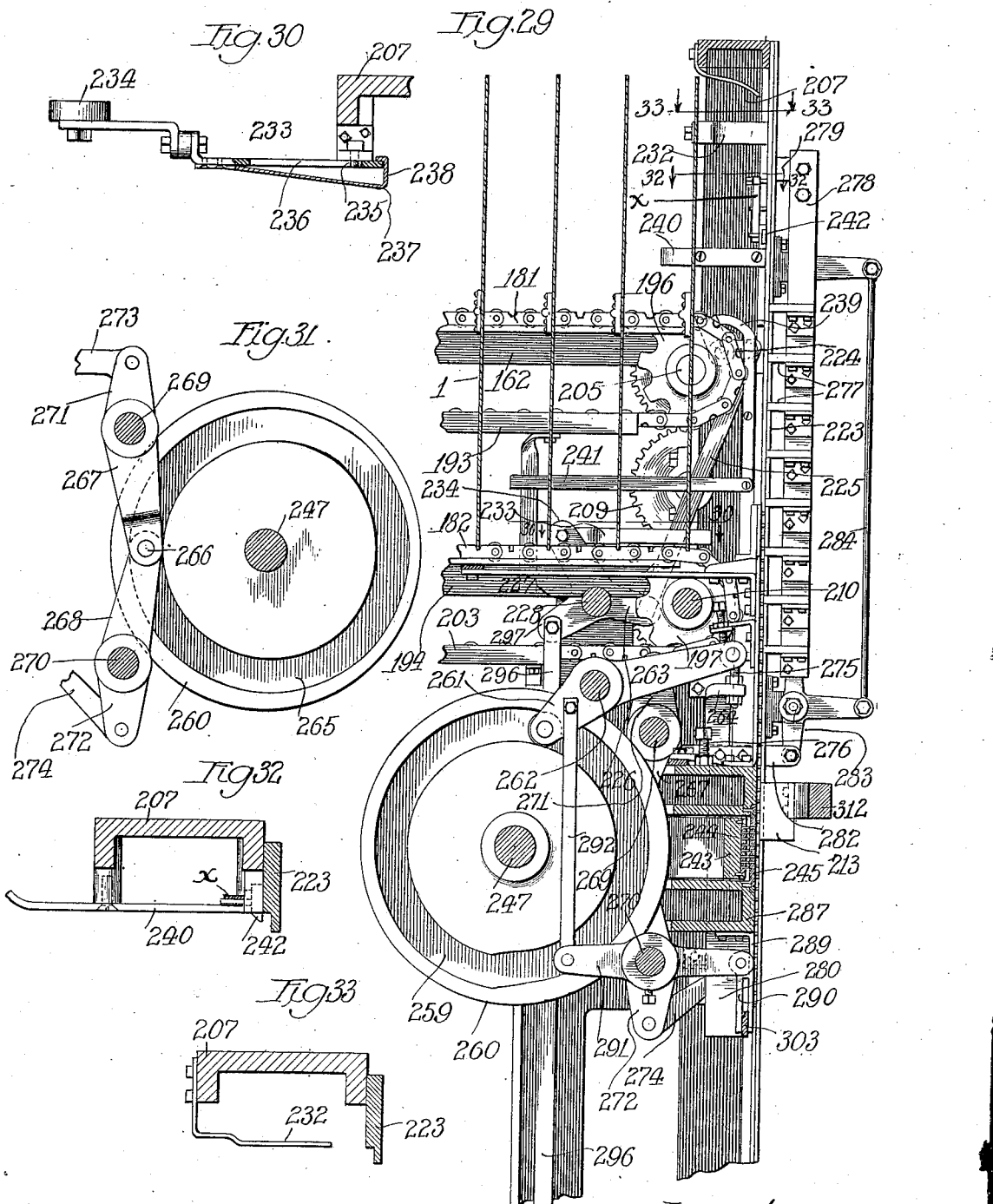

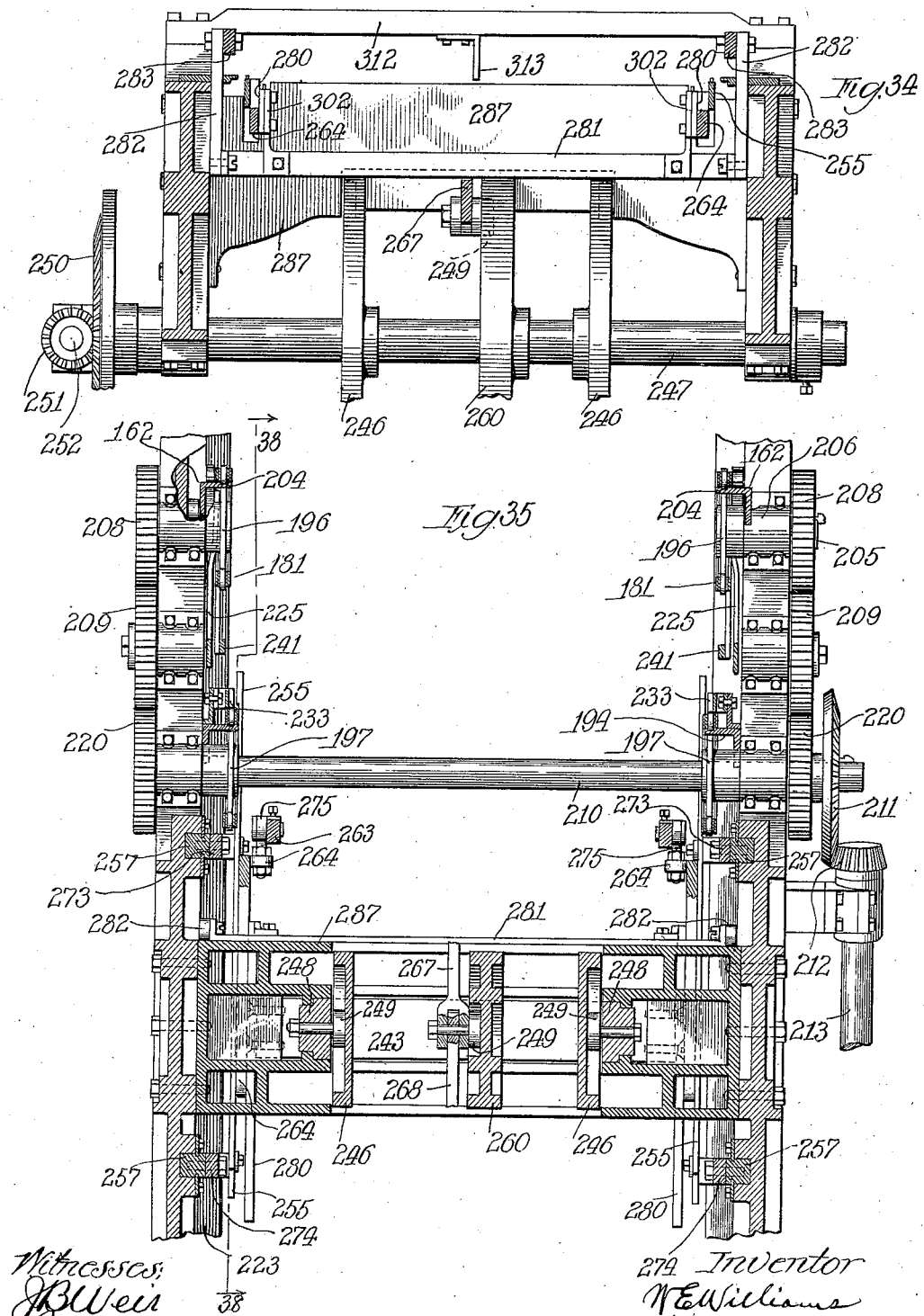

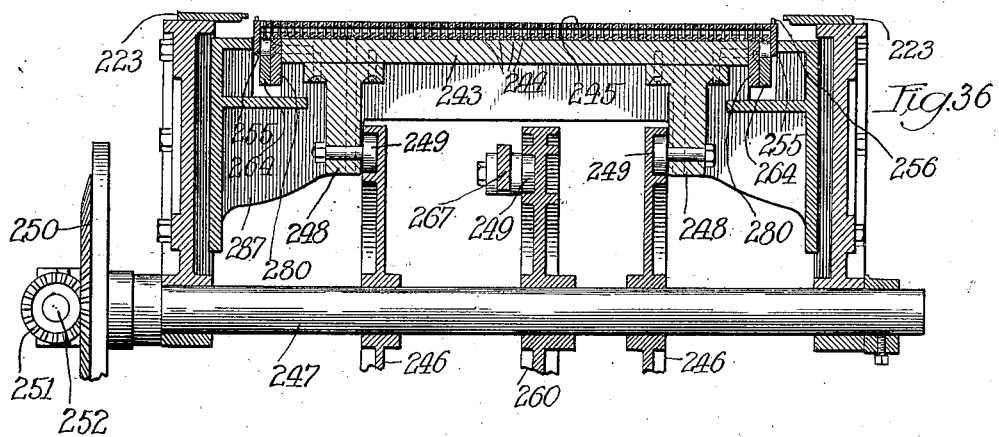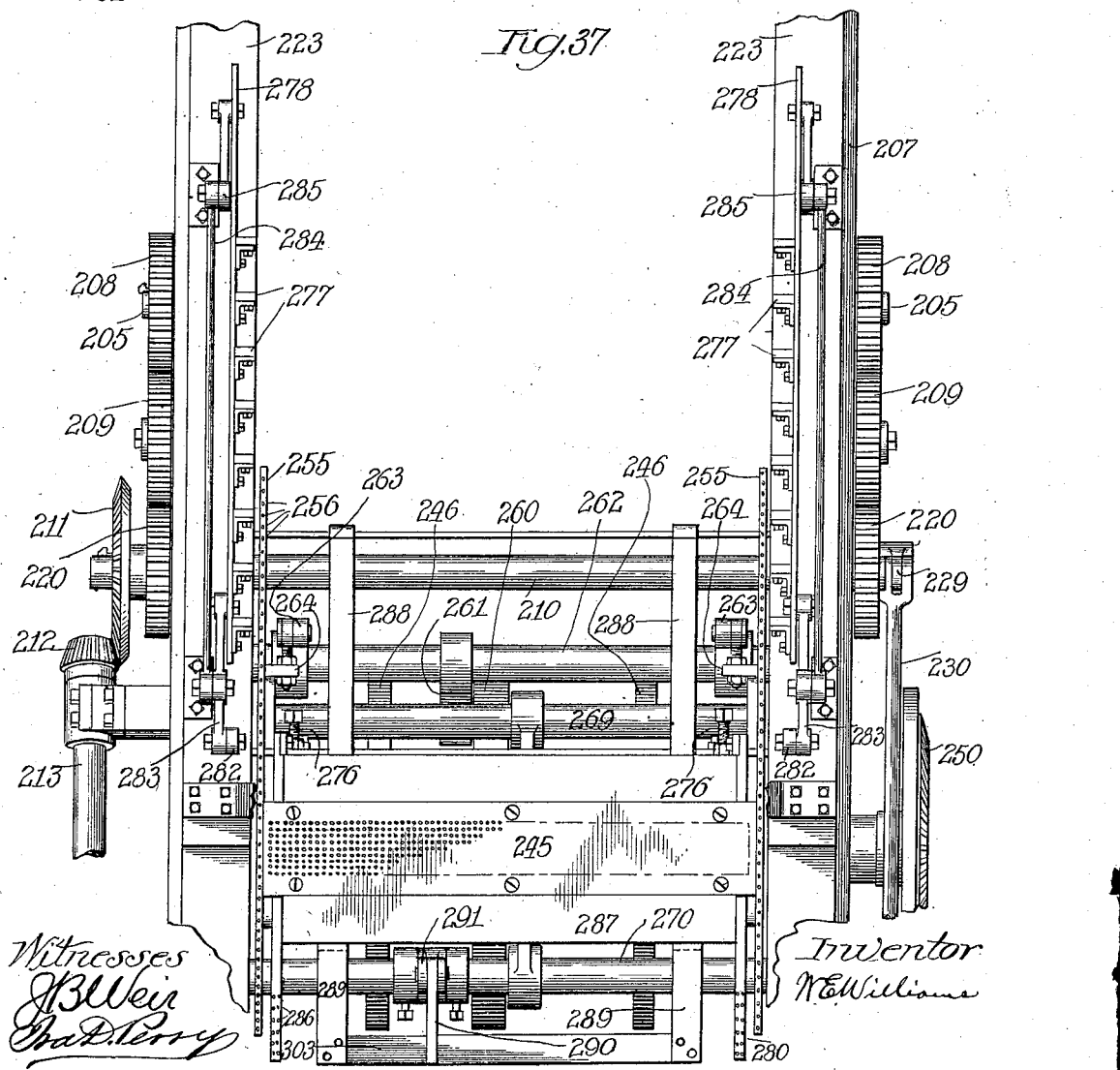

No. 876,921. PATENTED JAN. 14, 1908.
W. E. WILLIAMS.
MATCH MACHINE.
APPLICATION FILED JUNE 13, 1903.
21 SHEETS—SHEET 16.
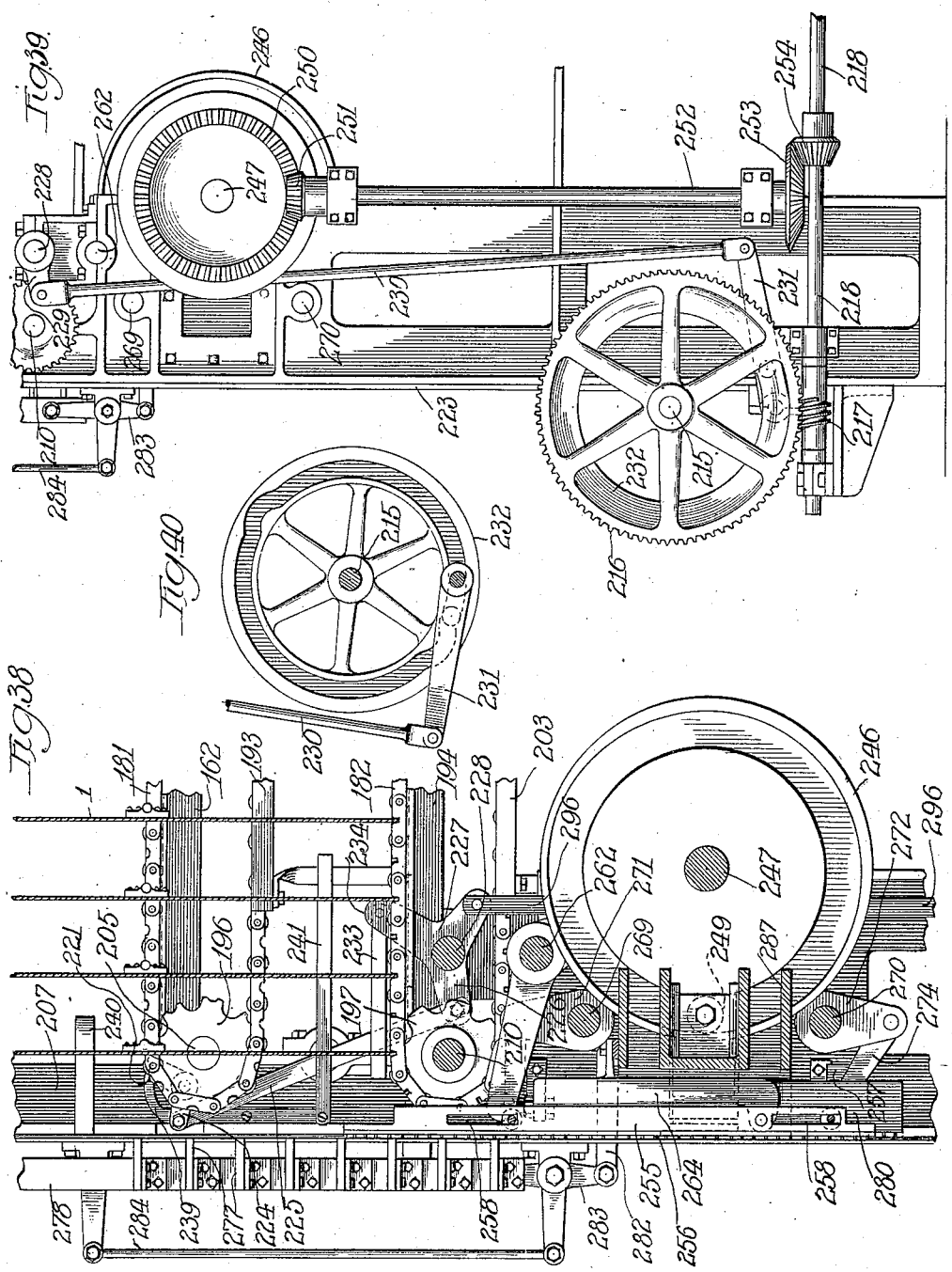
Witnesses
J B Weir
Ira D Perry
Inventor
W E Williams No. 876,921. PATENTED JAN. 14, 1908.
W. E. WILLIAMS.
MATCH MACHINE.
APPLICATION FILED JUNE 13, 1903.
21 SHEETS—SHEET 17.
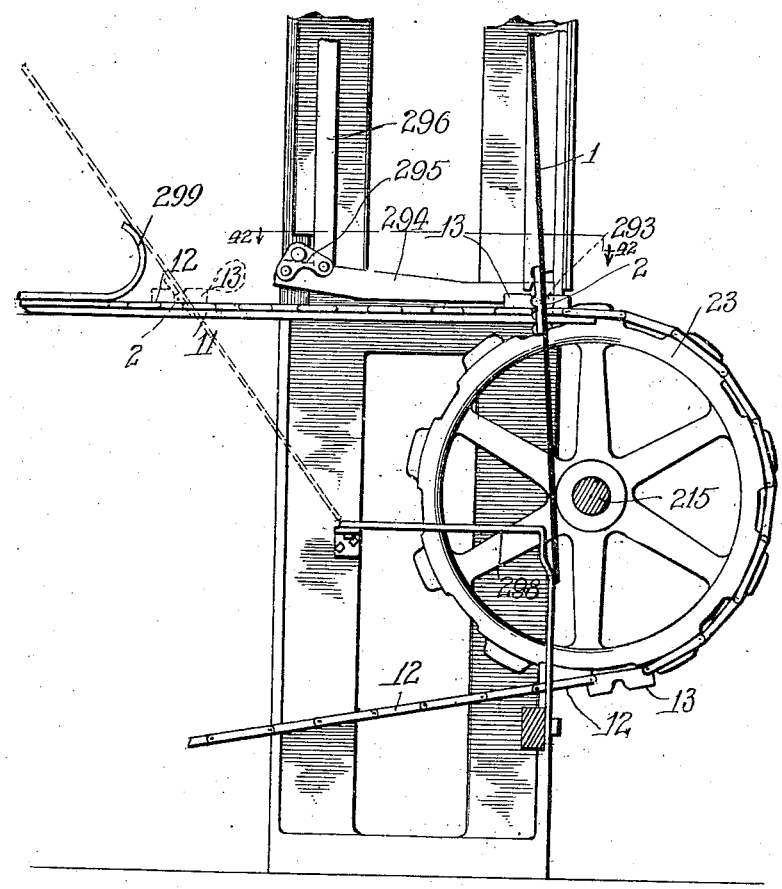
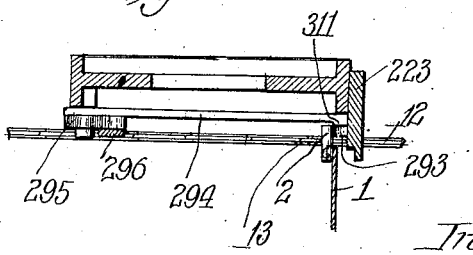
Witnesses
Edward R Barrett
JB Weir
Inventor
W E Williams

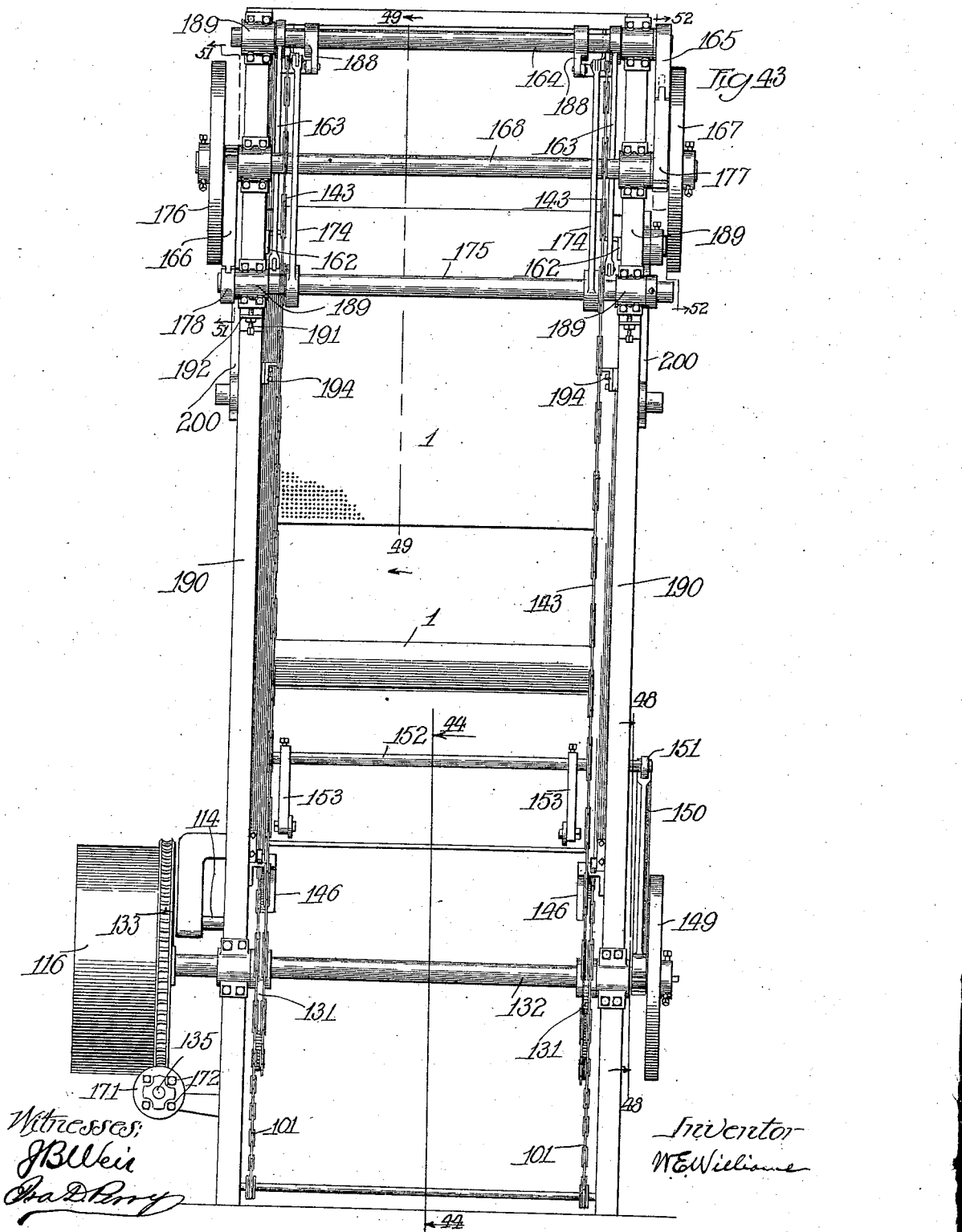

No. 876,921.
PATENTED JAN. 14, 1908.
W. E. WILLIAMS.
MATCH MACHINE.
APPLICATION FILED JUNE 13, 1903.
21 SHEETS—SHEET 19.
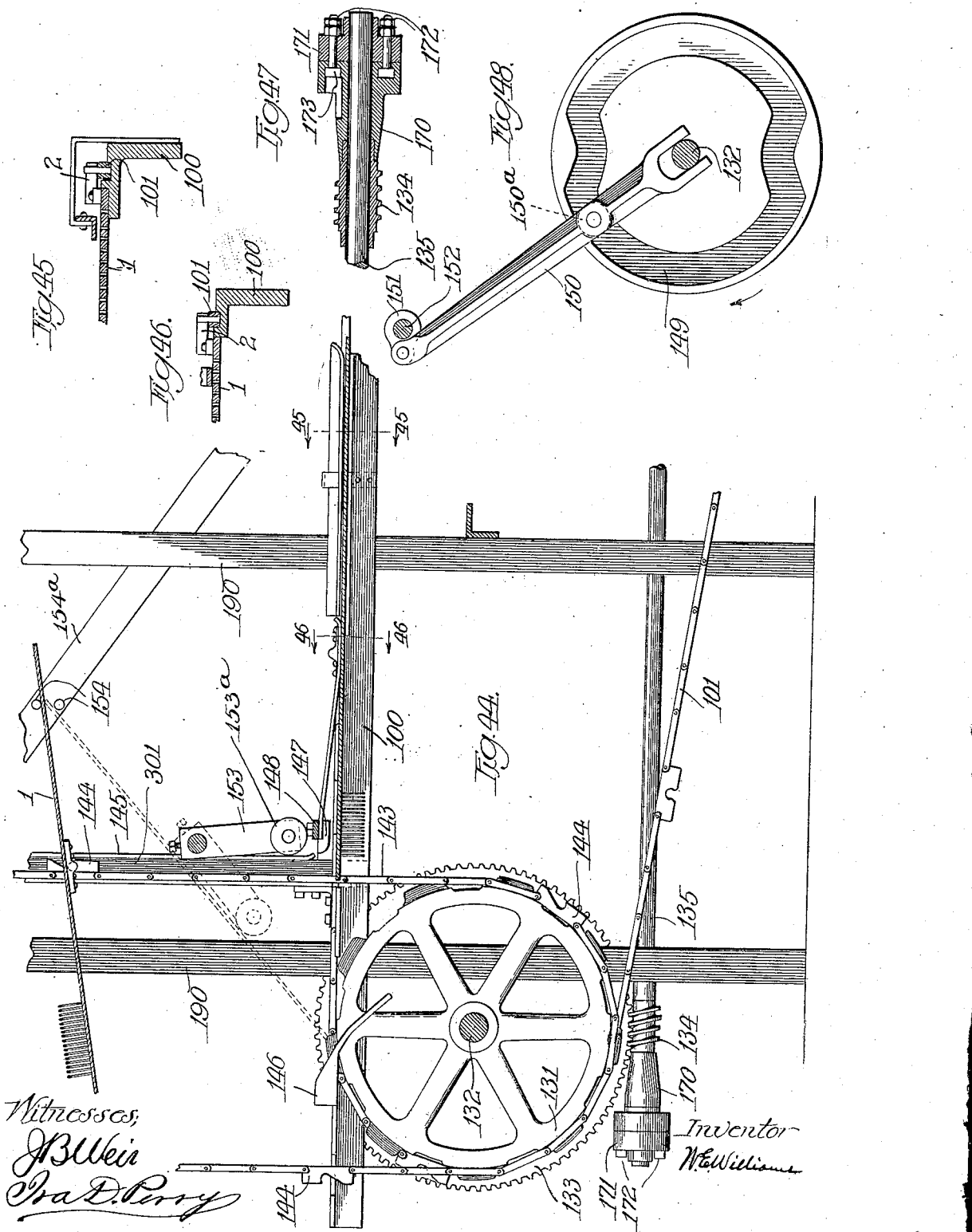

No. 876,921. PATENTED JAN. 14, 1908.
W. E. WILLIAMS.
MATCH MACHINE.
APPLICATION FILED JUNE 13, 1903.
21 SHEETS—SHEET 20.
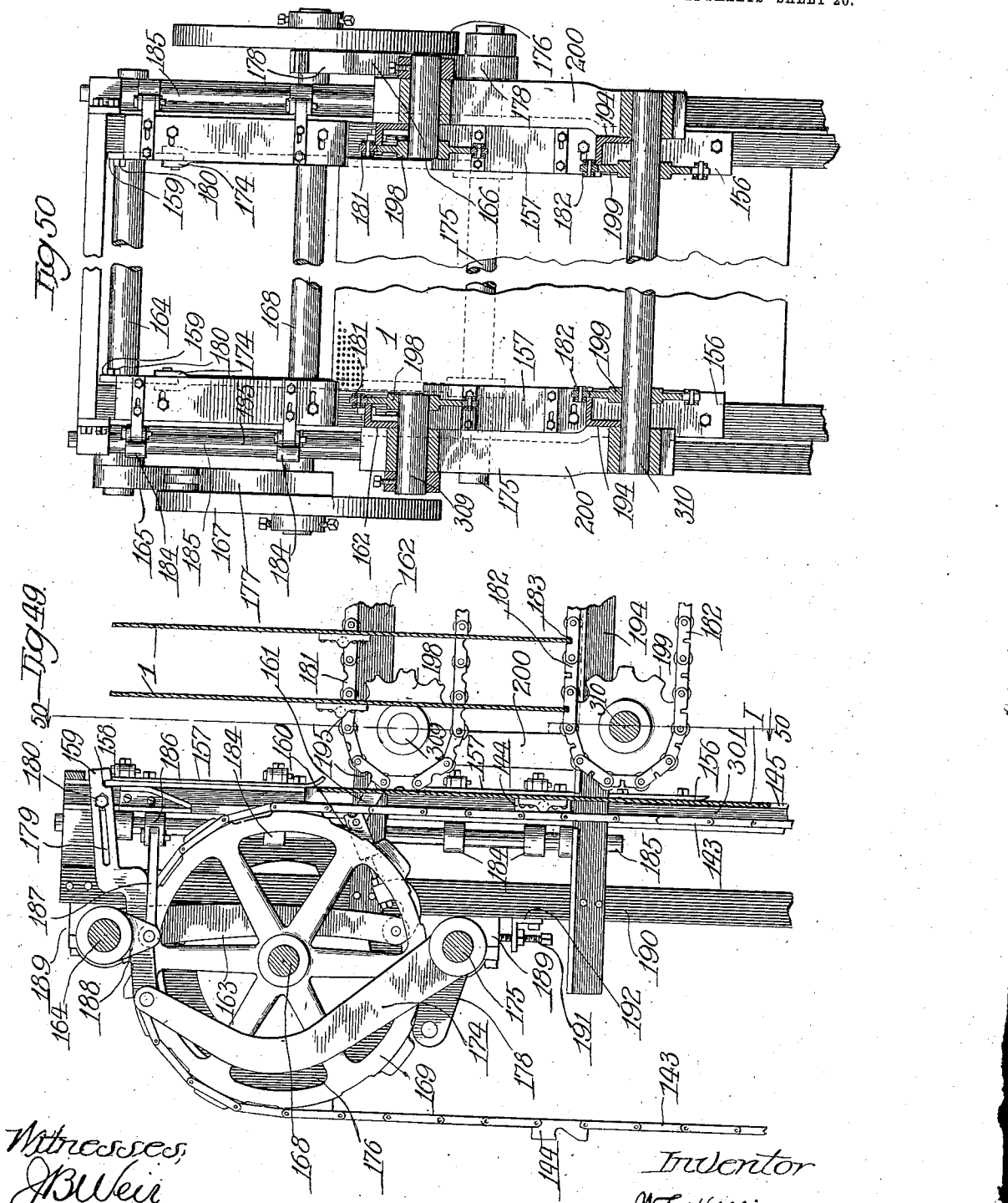
Witnesses,
J B Weir
Isa D. Perry
Inventor
W. E. Williams No. 876,921. PATENTED JAN. 14, 1908.
W. E. WILLIAMS.
MATCH MACHINE.
APPLICATION FILED JUNE 13, 1903.
21 SHEETS—SHEET 21.
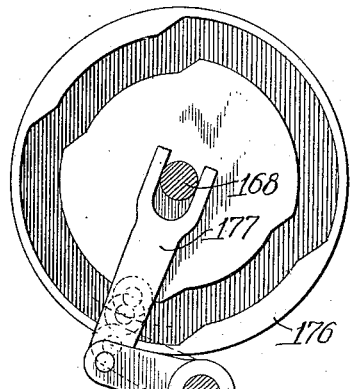
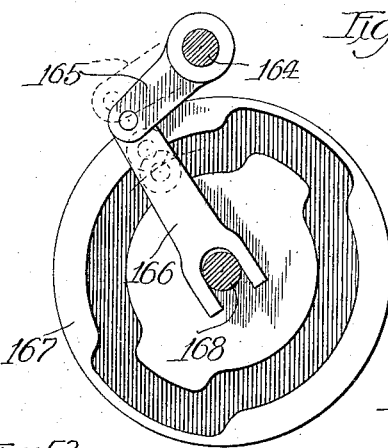
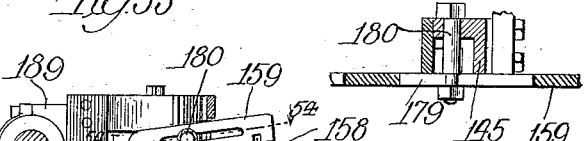
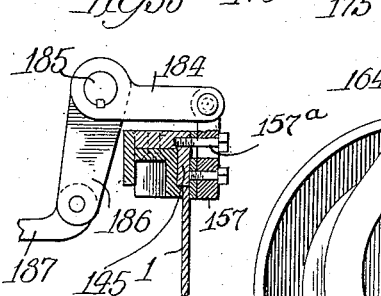
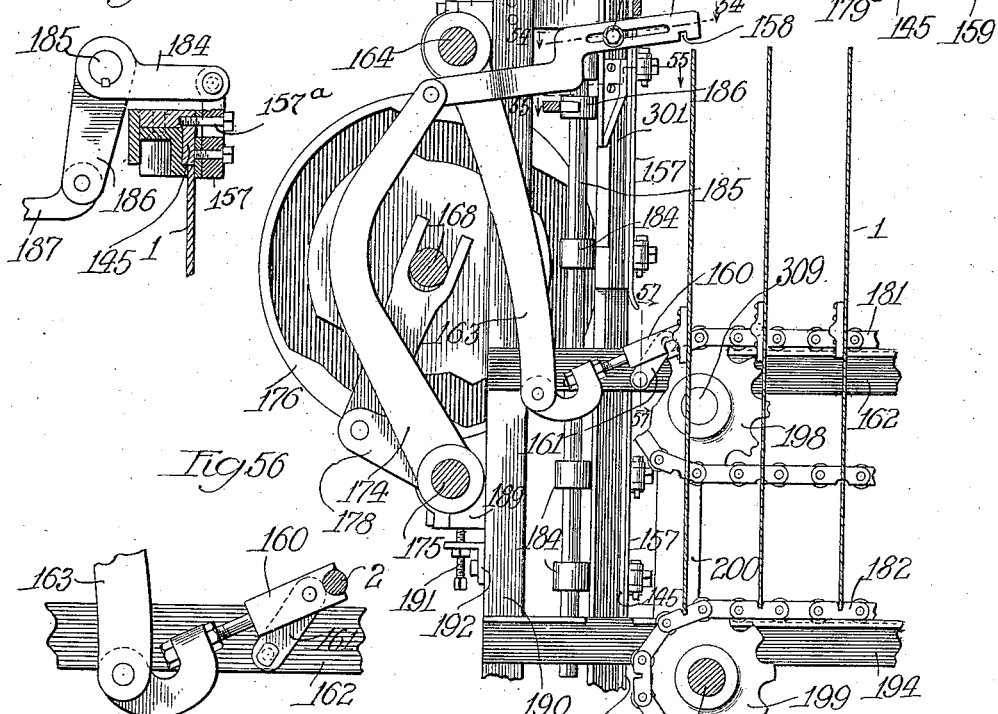
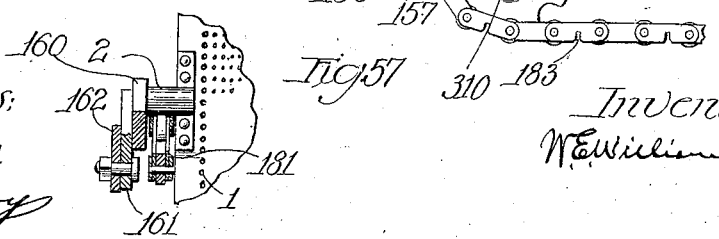

UNITED STATES PATENT OFFICE.

WILLIAM ERASTUS WILLIAMS, OF CHICAGO, ILLINOIS, ASSIGNOR TO THE DIAMOND MATCH COMPANY, OF NEW YORK, N. Y., A CORPORATION OF ILLINOIS.

MATCH-MACHINE.

No. 876,921.  Specification of Letters Patent.  Patented Jan. 14, 1908.

Application filed June 13, 1903. Serial No. 161,255.

*To all whom it may concern:*

Be it known that I, WILLIAM ERASTUS WILLIAMS, a citizen of the United States of America, residing at the city of Chicago, in the county of Cook and State of Illinois, have invented certain new and useful Improvements in Match-Machines, of which the following is a specification.

This invention relates to match making machines, having reference especially, though not exclusively, to that class of machines in and by which splints are cut from blocks of wood and inserted row by row in a carrier whereby they are conveyed to and through a dipping station for the application of paraffin and ignitible composition to the free ends of the splints; thence through a suitable space to effect the setting and drying of the composition thus applied, and, finally, to and through a discharging station wherein the treated splints, as complete matches, are ejected from the carrier.

The object of the invention is to provide a machine wherein the respective operations above indicated shall be performed in an efficient manner, and which machine shall combine in its organization the special merits of large productive capacity and increased drying facility, with economy of space, reduced liability to fire loss, convenience and economy of operation and simplicity of adjustment.

To this end my invention, generally stated, comprises various novel structural features, combinations of parts, and organizations of mechanisms, which will be hereinafter fully set forth and claimed.

I have herein illustrated a preferred embodiment of my invention, but it is to be understood that the machine may be considerably modified without departing from the fair spirit of the invention, which in many respects comprehends broadly new features in the art under consideration. For example, in the machine herein illustrated, I employ a series of independent match carriers or plates provided with rows of perforations in which the matches are forced and frictionally held; but any other appropriate construction of match carrier mechanism may be employed.

While the present machine is a complete organization of mechanism I shall for convenience of description, hereinafter refer generally to the parts of the machine which cut the splints and insert them in the match carrier, as the "sticker"; to the parts which dip the match sticks, as the "dipper"; to the parts which elevate the carrier plates or sections, as the "elevator"; to the parts which bear the plates while the matches are drying, as the "drying conveyer", and to the parts which unload or discharge the matches from the carrier, as the "unloader".

Referring now to the accompanying drawings—Figure 1 is a side elevation of the machine, with some duplicate sections omitted. Fig. 2 is a perspective view of one of the match carriers or plates. Fig. 3 is a side elevation of the sticker mechanism. Fig. 4 is a similar view of the unloader end of the machine. Fig. 5 is a like view of the elevator end thereof. Fig. 6 is a like view of the igniting composition vat of the dipper. Fig. 7 is a transverse vertical section, as on the line 7—7 of Fig. 6. Fig. 8 is a sectional detail, enlarged, of one end of the composition vat. Fig. 9 is a transverse section through said vat as on the line 9—9 of Fig. 7. Fig. 10 is a plan of one end of the vat. Fig. 11 is a plan of the sticker, with parts omitted to expose parts otherwise concealed. Fig. 12 is a longitudinal vertical section through the sticker, as on the line 12—12 of Fig. 11. Fig. 13 is a sectional elevation of the sticker, as on the line 13—13 of Fig. 11. Fig. 14 is a sectional detail of the outer end of the feed trough. Figs. 15 and 16 are sectional elevations of the "sticker", as on the lines 15—15, and 16—16, respectively, of Fig. 11. Fig. 17 is a view of the underside of the block clamp of the feed trough. Fig. 18 is a section as on the line 18—18 of Fig. 17. Fig. 19 is a sectional elevation of the feed trough, and adjuncts, as on the line 19—19 of Fig. 11. Fig. 20 is a sectional detail, as on the line 20—20 of Fig. 19. Fig. 21 is a plan of a portion of the cutter head of the sticker. Fig. 22 is a longitudinal vertical section, as on the line 22—22 of Fig. 21. Fig. 23 is a transverse vertical section, as on the line 23—23 of Fig. 22. Fig. 24 is a perspective view of one of the splint cutters. Fig. 25 is a similar view of one of the locking bars for said cutters. Fig. 26 is a vertical section through the unloader mechanism, as on the line 26—26 of Fig. 28. Fig. 27 is a sectional detail, as on the line 27—27 of Fig. 26. Fig. 28 is a sectional elevation of the "unloader" mechanism, as on the line 28—28 of Fig. 26. Fig. 29 is a sectional view, similar to Fig. 26, taken on the line 29—29 of Fig. 28. Fig. 30 is a sectional detail, as on the line 30—30 of Fig. 29. Fig. 31 is a reverse view of the cam 260 (and adjuncts) from that shown in Fig. 29. Figs. 32 and 33 are sectional details, as on the lines 32—32 and 33—33, respectively, of Fig. 29. Fig. 34 is a horizontal section, as on the line 34—34 of Fig. 26. Fig. 35 is a transverse vertical section, as on the line 35—35 of Fig. 26. Fig. 36 is a horizontal section, as on the line 36—36 of Fig. 26. Fig. 37 is an elevation of a portion of the discharging end of the unloader. Fig. 38 is a longitudinal vertical section, as on the line 38—38 of Fig. 36. Fig. 39 is a partial side elevation of the unloader end of the machine. Fig. 40 is a detail illustrative of cam 232, and adjuncts. Fig. 41 is a vertical section through the lower portion of the unloader end of the machine. Fig. 42 is a horizontal section, as on the line 42—42 of Fig. 41. Fig. 43 is an end elevation of the plate elevator. Fig. 44 is a longitudinal vertical section as on the line 44—44 of Fig. 43. Figs. 45 and 46 are sectional details, as on the lines 45—45 and 46—46, respectively, of Fig. 44. Fig. 47 is a sectional detail of an adjusting block hereinafter referred to. Fig. 48 is a sectional detail, as on the line 48—48 of Fig. 43. Fig. 49 is a longitudinal vertical section, as on the line 49—49 of Fig. 43. Fig. 50 is a transverse vertical section, as on the line 50—50 of Fig. 49. Figs. 51 and 52 are vertical sections, as on the lines 51—51 and 52—52, respectively, of Fig. 43. Fig. 53 is a view similar to Fig. 49, but with the parts in another position, the sprocket wheel and chain being omitted for the sake of clearness. Fig. 54 is a sectional detail, showing the pivotal mounting of one of the latch arms at the top of the elevator, as on the line 54—54, of Fig. 53. Fig. 55 is a similar detail showing one of the movable guides, and its connections, as on the line 55—55 of Fig. 53. Fig. 56 is a detail of one of the plate lifter devices at the top of the elevator. Fig. 57 is a vertical section through the same, as on the line 57—57 of Fig. 53.

In the present machine the match carriers comprise plates 1 provided with parallel rows of perforations for the reception and retention of the splint ends, such plates being somewhat longer than those usually employed as match carriers. Each plate is provided with trunnions, 2, located at the edges of the plate midway of its length, but offset from the top of the plate as indicated in Fig. 2. In addition to the usual perforations for the reception of the splints there is provided adjacent each edge of the plate, and parallel therewith, an extra row of holes, or perforations, 3, which are somewhat larger than the others and are used in the operation of impelling the plate through the unloader hereinafter described. Devices are provided for engaging the trunnions 2, and holes 3, of the plates and thereby carrying the plates progressively through the machine, such devices being so constructed and arranged that the plates are separate and independent of each other, to the end that any or many plates may be removed and replaced at pleasure without affecting the efficient operation of the remaining plates and other elements of the machine.

The wood is supplied to the sticker, which cuts and inserts the match splints into the perforations of the plates, or carriers, which are fed through or over the sticker end to end. Thence the plates pass forward to and through the dipping parts where the paraffin (or sulfur) and the "heading" or igniting compound is applied to the free ends of the splints. The plates are thereafter lifted by the elevator, turned over and set on end in the drying conveyer which transports them slowly back to the unloader. Here mechanism is provided to transfer the plates, one by one, from the drying conveyer to the unloader, wherein each plate is carried down past a series of punches operating to act upon and discharge the finished matches from the plate. This done, the empty plate is delivered to the sticker to be refilled with splints as before, and the operation above outlined is repeated.

I will describe, first, the splint cutting and setting parts of the machine, which I have designated the sticker, reference being had to Figs. 3 and 11 to 25, inclusive of the drawings. Power for the entire machine is applied to the belt wheel 4, upon the main drive shaft 5. This shaft is provided with double cranks 6, 6, which are connected by rods 7, 7 with a vertically reciprocating cross-head 8, by which are borne the match splint cutters 10 and the mechanism for inserting the rows of splints into the corresponding rows of perforations of the match carrier plates. A feed trough 9, provided with a plurality of feeding compartments—in the present instance, four—is arranged to deliver match blocks to the cutters on the cross-head, said cutters being mounted in plural sets corresponding with the compartments of the feed trough. The plates are carried through and past the "sticker", by endless chains 12, which are arranged along laterally disposed guide-bars, 11, on which the edges of the plates are guided and supported. The chains are provided at intervals (the length of a plate) with special links 13, which are designed to engage the trunnions of the plates. These links project above the upper edges of the chains and are provided with suitably located notches 13ᵃ for the reception of the trunnions. The trunnions are maintained in the links by gravity, save only when the plate passes over the plane of insertion of the match splints where there is provided a cross-bar 14, which, overlying the plate, serves as a backer to counteract the thrust of the splint setting operation.

The chains 12 are arranged in parallelism, and are carried by sprocket wheels 15, 23, located at the sticker and unloader, respectively. These wheels are driven by appropriate connections from the main shaft in a manner to impel the said chains in synchronism with the reciprocations of the cutters to insure the alinement of the succeeding rows of perforations of the plates with the rows of splints as the latter are successively cut and introduced to the perforations. In the present instance the shaft, 304, bearing the sprocket wheels 15, is provided at one end with a worm wheel 16, with which co-acts a worm 17 on a longitudinally disposed shaft 18 which is driven from the main shaft by co-acting bevel gears 19, 20 on the shafts 18 and 5 respectively. Preferably, the worm 17 is connected to its shaft through the medium of an adjusting block 21 (see Fig. 47) whereby the accurate alinement of the plate perforations with the match sticks from the cross head, shall be assured. The chains 12, after passing the sprocket 15, pass down and under tightener wheels 22, and then up over the sprocket wheels 23 to the guide bars, where they receive the plates as they are delivered by the "unloader."

The feed trough is set at the desired angle to the row of cutters and is equipped with rows of sprocket chains 24, provided with points 25, arranged to travel along the bottom of the respective compartments of the feed trough, and carry forward the match blocks (26) both by the friction of the blocks on the chains and by the points 25 engaging said blocks. Across the top of the compartments is mounted a milled feed roller 27, the shaft 27ª of which has its bearings in boxes on the sides of the hopper. This roller acts upon the opposing surfaces of the blocks and in connection with the chains 24, insures the positive feed of the blocks to the cutters. In advance of the feed roller is a shield 308, which is designed to prevent the roller from being accidentally injured by hammer blows from the block feeders. The roller 27 and chain 24 are driven from the main shaft 5, by an intermittently acting worm 28 on said shaft, such worm being so constructed that the screw or incline part thereof is upon ninety degrees of the circumference of the thread, the remainder being straight. The worm engages a worm wheel 29 on the lower end of a vertical shaft 30, which carries at its upper end a bevel gear 31, co-acting with a similar gear 32 on the end of the roller shaft. Thus the roller is intermittently rotated. On the opposite end of the roller shaft is a pinion 33, engaging a gear 34, on a shaft 35, which is supported in bearings in the walls of the block hopper and below the feed compartments thereof. This shaft carries two sprocket wheels which are located at points 36 in cavities in the bottom of the feed trough and are constructed to carry and drive the two inner chains 24. Fixed on the shaft 35, is a bevel gear 37 which co-acts with a similar wheel 38 on a shaft 39, mounted to rotate exteriorly of one side of the hopper. This shaft 39, carries three bevel gears 40, 41 and 42, which are arranged at intervals and engage, respectively, gears 43, 44 and 45 whose shafts extend transversely through the hopper. The last-named shafts carry sprocket wheels which are located in cavities in the bottom of the feed trough at points respectively, 46, 47, 28, which wheels carry the three other sets of chains within the feed trough bottom.

The chains 24 pass around sprocket wheels 49 at the outer end of the feed trough, the shafts of said wheels being mounted in blocks 50 slidingly fitted in slots or ways in the bottom of the trough. The inner ends of these blocks terminate in screws 51 which extend through depending lugs on the trough bottom and are provided with set nuts 51ª, by the manipulation of which the blocks and therewith the sprocket wheels may be adjusted in a manner to regulate the tension of the chain 24, as desired.

The location of the points, 36, 46, 47 and 48 at which the respective pairs of chains 24 start to return and thus cease to act on the match blocks, is such in respect to the cutters, that for each row or channel of blocks that is being carried forward, there will be the same short distance between the point the chains cease to drive the blocks and the position where the cutters act on the blocks, thus minimizing the liability of the blocks to jump forward by the elasticity of the wood under pressure of feeding. The match blocks (26) are pressed over solidly against the back walls of the feed trough divisions by the action of flat springs 52 fixed in the sides of the partitions 53, and thus such blocks are sustained to resist the backward thrust of the cutters. The blocks are also clamped downward at the time of the cutting, by springs 54 attached to a bar 55, mounted across the top of the feed trough in front of the cutter's path. The bar 55 is secured at its ends to blocks 56 which are pivoted to blocks 57 rigidly fastened to the frame 58 of the sticker, which arrangement allows the bar 55 to swing up and down on its pivotal connection. The outer ends of the bars 55 are affixed to blocks 59, 60, provided with studs 61, 62 respectively, to which are secured the upper ends of rods 63, 64, whose lower ends are fixed to cam roller blocks 66, 67, engaging cams 69 on the main shaft 5. These cams are provided with tracks or rims on which the cam rollers travel, whereby at the time of the cutting of the match sticks, the bar 55 is depressed and caused to clamp solidly the match block from which the sticks are being cut, and whereby, subsequently, during the feeding of the blocks the bar is raised to release the blocks.

The match cutters 10 (see Figs. 21 to 25 inclusive) are each provided with a small pin or stud 71 by means of which they are held into the cutter head of the cross-head. The cutter head comprises a flat inclined piece 72 which forming the bed upon which the cutters rest, inclines them toward the match block in a manner to insure a draw cut or a plane-bit action upon the said block. Above the piece 72, is a slotted bar 73, in which are formed transverse slots 74, for the reception of the cutters. Lengthwise of the bar is a slot 75, in which are located locking bars 76, for clamping the pins 71 of the respective sets of cutters up against the side (70) of the slot 75, and thereby holding them securely in place in the cutter head. The slots 74 are provided with a narrow portion at the top extending from the outside at the back through into the slot, 75, to permit the pin 71 to enter and pass up against the farther wall 70 of slot 75. Each of the locking bars 76 is slotted across the bottom to permit the entry of the pins 71 of the cutters from the back of the face of said bar. The lower edge of the bar throughout its length is offset or cut away a distance substantially equal in height and depth to the height and thickness respectively of a pin 71, as indicated at 77. The corners of this portion 77, where the slots intersect the same, are each slightly rounded, which corners, co-acting with the round pins, act as cams to force such pins up against the wall 70 of slot 75, when the bar 76 is moved longitudinally in the latter after the cutters have been introduced. The locking bar is provided midway of its length with a block 78, which extends through a guide slot 79, in the bar and has on its upper surface a pivot stud 78ᵃ which engages a lever 80 fulcrumed on the bar 81, whereby by the actuation of the lever the locking-bar may be moved in respect to the cutters to lock or release the same. Pins 82, 83 afford stops to limit the movement of the lever 80, and an ordinary spring controlled puppet pin 85 intermediate the stops, affords means to lock the lever in either the locking or releasing position.

The construction just described is of much practical value in that it permits the release on the fastening of a set of cutters quickly and without wrenches or other tools. Moreover, the location of the locking device, being up close to the end of the cutter, permits the practical use of almost the entire bar of steel of which the cutter is made, since, as the cutter is worn out a new one may be formed on the end of the bar and a new pin hole made farther down, and so on, until the bar is used up within practical limits.

On the front of the bar 73 are secured splint guide blocks 85, provided with vertical grooves 86 directly over the apertures of the cutters, which grooves are adapted to receive the splints as cut and insure their entrance into the perforations of the carrier plate. Located in the cavity in the cross-head 8, is a backer bar 87 (see Figs. 11, 12 and 13) which is connected by rods 88 to a cross bar 89 provided at its ends with rollers 90 working in appropriate cam ways 91 on the frame of the sticker, whereby, during the vertical movement of the cross-head, the backer bar is moved out and under the holes of the cutters to sustain the thrust of the sticks in the splint setting operation, and is retracted out of the way and clear of the match block during the splint cutting operation.

Fixed to the forward edge of the feed trough is the usual pin bar 92 (Fig. 12) on which the cutters descend and finish the severance of the splints from the block. Bolted to the feed trough is a supporting arm 93, which extends up under the match plate in a position to support the median portion thereof against the strain incident to the pulling of the match sticks from the cutters immediately after the sticking stroke. A suitably located air trunk 94 carries off the waste, slivers, &c. from the cutters.

It will be seen that the feeding of the match blocks to the cutters may be stopped or resumed at will by throwing the gear 32 of the feed roller shaft out of or into gear with the gear 31, on the power transmitting shaft 30 before described. As a simple and efficient means to this end, I spline the gear 32 to the feed roller shaft, and provide the hub of said gear with a collar 95, pivotally connected to the limbs of a yoke frame 96 having an arm or extension that is, in turn, pivoted to the frame of the "sticker". The yoke frame is connected by means of a link 97 to a hand lever 98, which is conveniently pivoted to the box of the roller shaft, whereby by the actuation of the lever the gear 32 may be moved in respect to the gear 31 for the purpose stated. (See Figs. 3, 11, 13 and 20.)

I will now describe the dipping mechanisms, reference being had more especially to Figs. 1, 3 and 6 to 10, inclusive, of the drawings. The carrier plates after being supplied with match sticks by the sticker, as hereinbefore described, are carried by the chains 12 to a similar set of chains 101, in advance thereof, the plates in their traverse passing from the lateral guides 11 of the "sticker" to similar guides 100 on the dipper frame. The chains 101 run on sprocket teeth arranged on the sprocket wheel 15 adjacent to the teeth for the chains 12, said chains 101 passing to and around suitably located sprocket wheels 131 on a shaft 132, at the elevator end of the machine. The chains 101 are provided at intervals with special links 102, similar in construction and arrangement to the links 13 of chains 12; such links 102 being timed by the wheels 15 to receive the trunnions 2 of the match plates progressively advanced thereto, and thereby to carry said plates onward through the dipper. Preparatory to the dipping operation, the splints are usually heated to facilitate the penetration of the paraffin therein, the heater being ordinarily a steam-jacketed table located between the paraffin pan and the sticker. The heater being old and well known, it has been omitted from the drawings. The paraffin pan, which is quite long, is designated at 305, Fig. 1. Over its central portion the guides 100 are depressed sufficiently to cause the free ends of the match sticks to dip for a proper distance into the paraffin as the match plates are carried along said guides by the chains 101. Directly above the depressed portion of the guides is mounted in suitably disposed bearings a shaft carrying a pair of sprocket wheels 103, which co-act with and are driven by the chains 101. These wheels are arranged to bear upon the trunnions 2 of the traveling match carrier plates and thus insure the depression of the latter and the consequent immersion of the match sticks in the paraffin. The paraffin, in liquid form, is pumped into the pan 305 from a steam-jacketed supply tank 107, such pan being provided, as usual, with a suitable overflow to insure the maintenance of a constant level of the paraffin within the pan. The pump, which is indicated at 104, is actuated by a lever 105 with which co-act cam-pieces 106 on the shaft of the sprocket wheels 103.

From the paraffin tank the match splints pass to and over the composition vat 108, in which are supported a supply roller 109; a limiting scraper 110; a cleaning scraper 111 and a strainer 112. The roller is provided with a hollow shaft 113 through which extends a splined shaft 114, carrying at one end tight and loose pulleys 115, which are engaged by a belt 116, driven from a wheel on the shaft 132. The vat 108 is supported upon legs 117, provided at their lower ends with rollers 118, running on rails 119 transversely of the machine, such rails being supported sufficiently above the floor to permit the unobstructed passage of the chains 101. This arrangement permits the vat, with its roller and appurtenances to be bodily withdrawn from under the match plates to facilitate cleaning and attention, without interfering with the rotation of the roller by its driving mechanism. At the ends of the vat 108 are castings 306 which afford end walls for the composition chamber of the vat. These walls are provided with boxes or journal bearings for the shaft 113 of the roller. The lower part of each box is integral with the casting and the roller shaft is admitted to the box through a vertical notch or opening 307 in the casting. The cap of the box fits down into such notch or opening, and the space above the cap is covered (to prevent escape of the composition from the vat) by a plate or block 121 clamped in place on the inner side of the casting by a screw 123 passing through a plate or block 122 on the outer side of the casting and into the plate or block 121. (See Figs. 8 and 10). Thus it will be seen that by loosening the screws of the box caps and the respective screws 123, the caps and plates or blocks 121, 122 may be removed and the roller lifted out of the vat as desired. The vat is provided at its ends with gates 128 to permit access thereto for cleaning, and it is also provided with a chamber 129 for the reception of hot water to keep the vat warm. A suitably disposed aperture 130 permits a thermometer to be placed into such water to denote its temperature.

For the purpose of holding down the match plates as they pass over the composition vat, and thus insuring the passage of the splints upon the composition on the revolving roller 109 in a manner to form uniform "heads," I provide, immediately above the tank, a pair of freely rotatable pressure rollers 126 that bear upon the traveling plates. These rollers are carried by a transverse shaft 127 having its bearings in posts 124 rising from guide pieces 125 on the dipper frame.

The shaft 132 which carries the sprocket wheels 131 around which pass the chains 101, hereinbefore described, is provided with a worm wheel 133 with which co-acts a worm 134 on a shaft 135 which extends alongside the machine and towards the shaft 18, previously mentioned, said shaft 135 being coupled by a universal joint 136 (see Fig. 3) to the shaft 18, and forming, in effect, a continuation thereof. Thus the power is transmitted to the shaft 132 and the effective actuation of the dipping mechanism is insured. The worm 134 is connected to its shaft 135 by means of an adjusting block 170 (See Figs. 5, 44 and 47) to permit the shaft 132 to be adjusted to meet the varying requirements of the chains 101. This block is composed of two sections 170, 171; the former being loosely fitted to the shaft and affixed to the opposing end of the worm; and the latter (171) being fixed to the shaft and connected to the section 170 by means of bolts 172 extending through segmental slots in the piece 170, and having their heads seated in an annular recess in the latter. By loosening the bolts 172, the piece 170 and its connected worm may be partially turned as desired, without turning shaft 135. The adjusting block 21 above alluded to in connection with the worm 17 and shaft 12, is identical in construction with the block 170, 171, just described.

It will be observed that the chains 101 in passing back to the sprocket wheels 15, pass over a tension device consisting of suitably disposed rollers 137, 138, and 139, which are arranged in pairs, to co-act with the respective chains. The rollers 137 and 139 are fixed in permanent bearings in the main frame while the rollers 138 are mounted on a frame 140 which is pivoted to swing on the main frame. Spring tension links 141 provided with adjusting nuts 142, connect the free end of the frame 140 with the main frame, and thus insure the yielding pressure of the rollers 138 against the chains 101.

The match plates, with the dipped matches therein, are carried from the composition vat to the elevator which I shall now proceed to describe; reference being had to Figs. 1, 5, 38, 39, 40, 43, 44 and 48 to 57 inclusive, of the drawings. 143 represents a pair of vertically disposed plate elevating chains which pass around an extra set of sprocket teeth located on the sprocket wheels 131 adjacent the teeth for the chains 101; and also around a pair of sprocket wheels 169 borne by a shaft 168 which has its bearings in boxes on the main supporting frame of the machine. The chains 143 are thus positively driven by the wheels 131. These chains 143, are similar in construction to the chains previously described, and are correspondingly provided with special links 144 which are notched, spaced and arranged to receive and catch the trunnions of the match plates as the plates are brought along by the chains 101. The chains 143 pass upward in guide ways 301 in vertical guide bars 145 which are bolted to the main frame work; the ends of the trunnions, as the plates are being elevated by the chains, projecting into said ways and being thereby temporarily prevented from accidental dislodgment from the links. At the ends of the guides 100 are suitably located stationary cam blocks 146 (see Fig. 44) against which abuts the leading end of each match carrier plate as it approaches the elevating mechanism, and by which blocks the plate is lifted to move the trunnions 2 partly out of the special links 102 of the chains 101. Hence, when the links 144 of the chains 142 engage the said trunnions, such links are enabled to raise the trunnions clear of the links 102 without liability of binding. Provision is had whereby the rearward end of the plate is swung downward as the trunnions thereof are being elevated. To this end blocks 147 are supported by a cross-bar 148 affixed to the guide bars 100 adjacent the guide bars 145, so as to take against the top of the match plate. As the elevation of the match plate continues it is swung around into the inverted inclined position shown in Fig. 44, by the following mechanism: Immediately above the blocks 147, is a pair of arms, 153, hung on a rock shaft 152 which has its bearings in boxes on the guide bars 145. The lower ends of these arms are preferably provided with rollers 153$^a$. On one end of the rock shaft is a crank 151, which is connected to a lever 150 whose lower end is bifurcated to embrace the driven shaft 132, and whose fulcrum comprises a wrist pin or roller 150$^a$, fitted to the groove of a face cam 149 on said shaft, whereby, during the rotation of the latter the arms 153 are oscillated. The cam is so timed that as the plate begins to ascend the rollers 153$^a$ of arms 153 bear upon the top of the plate and turn it around about its trunnions, as indicated; the upper end of the plate thereupon passing between pins 154 which are supported upon suitably located bars, as 154$^a$, affixed to the main frame. During the continued elevation of the plate, its end slides in between the pins and in consequence the plate is still farther turned. (See Fig. 44). Then, as the plate progresses farther, and the end thereof is withdrawn from the embrace of the pins 154, the revolution of the plate is completed by gravity, the plate thus occupying a vertical position between the guide bars 145. To prevent an abrupt swing of the plate about its trunnions when its end is released from the pins 154, there are provided springs 155 (see Fig. 1) located on the bars 154, so as to bear against the edges of the plate and retard the swing thereof as the revolution is completed. On the farther elevation of the plate, it passes between fixed and movable guide pieces 156 and 157, respectively, on the bars 145, and is thereby maintained in upright position until the completion of its ascent; whereupon the plate is bodily transferred to a pair of horizontal chains 181, 182, hereinafter described and conveyed thereby to the unloader. The guide pieces 156 just mentioned, are affixed directly to the bars 145; but the pieces 157 are peculiarly mounted and arranged to coöperate with the plate transferring mechanism, as as will be presently explained.

Referring to the plate transfer mechanism 160 represents a pair of plate lifting arms pivotally connected to the lower ends of a pair of rock arms 163, depending from a rock shaft 164 which is located at the top of the elevator mechanism. The arms 160 are also supported by means of links 161 pivoted thereto and to horizontal rails 162 (by means of which the plates are subsequently laterally guided and supported) whereby said arms, through the actuation of the rock shaft, may be oscillated toward and from the match plate at the top of the elevator. The free or acting ends of these arms 160 are notched, as indicated, so as to engage the trunnions in said plate, (as seen more clearly in Fig. 56,) when the arms are swung thereto, and thus lift the plate bodily from the elevator chains and transfer it to the conveyer chains 181, 182. The rock shaft is provided with a crank arm 165 which is connected to an arm, 166, bifurcated at its lower end to embrace the driven shaft 168 and provided with a roller which engages a face cam 167 on said latter shaft, whereby the rock shaft is actuated for the purpose stated. The upper end of the plate is supported and steadied during the operation of the lifter arms, by means of a pair of latch arms, 159, which are provided at their free ends with suitably located notches 158 with the upper edge of the plate registers when the plate reaches the summit of its elevation preparatory to the action of the lifter arms 160. The latch arms are slidingly and pivotally supported upon screw pins 180 at the top of the guide bars 145; such arms being longitudinally slotted, as at 179, for the passage of the pins. The rearward ends of the latch arms are pivoted to the upper ends of rock arms 174 rising from a rock shaft 175, which has its bearings in boxes below the shaft 168. The shaft 175 is provided with a crank arm 178 which is connected to an arm 177 bifurcated at its upper end to embrace the shaft 168 and bearing a roller which engages a face cam 176 on the shaft 168, whereby the latches are reciprocable to and fro in harmony with the lifter arms in a manner to steady the plate while it is being transferred to the conveyer chains.

The movable guide pieces 157 above alluded to, are each slidingly connected by a pin and slot connection 157$^a$ (Fig. 55) to the adjacent bar 145 so as to be movable into and from the path of the plate. These pieces are pivoted to arms 184 carried by vertical rock shafts 185. These shafts are provided with crank arms 186 which are connected by means of links 187 to similar arms 188 on the rocker shaft 164. (See Figs. 49, 50, 53 and 55.) The time of movement of the cam 167 actuating the shaft 164, and its connections, is such that before the clearance between the lifter arms 160 and the trunnions of the plate is passed, the movable guide pieces are moved clear of the adjacent edges of the plate so as to permit its being lifted bodily out on to the chains of the "drying conveyer." The time of both cams 167 and 176 is such that the lifters 160 and latches 159, after setting out the plate, remain projected for a sufficient length of time to permit the conveyer chains to carry the plate away from the engagement of the lifters, whereupon the lifters and latches are returned to their previous position in readiness for the repetition of their action upon the next succeeding plate in the elevator.

The shafts 168, 164 and 175 are journaled in castings 189 which are supported in sliding contact with the frame posts 190, with means whereby the castings may be adjusted vertically to regulate the tension of the elevator chains 143 as desired. In the present instance, this means comprises adjusting screws 191, which are fitted in brackets 192 affixed to the frame posts 190, directly under the castings.

The sprocket wheels 15, 23, 131 and 169, together with the worm gears and cams fixed on the same shafts with said sprocket wheels are of a circumference or time equaling the length of two match splints, and hence the cam ways herein illustrated show double points of the same action in one revolution.

It will be observed that the vertical guide bars 145 are cut away at the top in proximity to the sprocket wheels 169, so that at this juncture, the trunnions are free from said bars to permit the removal of the plates therefrom as above described. It will be observed also that the match plate in being elevated from the dipper to the drying conveyer, as hereinbefore set out, is made to turn through an arc of about 270 degrees, the effect of which is to impart a good shape to the match head and permit the setting of the head sufficiently to avoid its distortion when in the drying conveyer.

Referring to the drying conveyer, (see Figs. 1, 5, 49, 50, 53) 181, 182 designate two pairs of endless chains (one pair being disposed above the other as illustrated) running in parallelism from the discharge portion of the elevator to the unloader end of the machine. The upper chains pass around sprocket wheels 198 and 196, arranged at the respective ends of the machine; and the lower chains pass around similar wheels 199 and 197, mounted below the wheels 198 and 196 respectively; both sets of chains being supported throughout their entire length upon upper and lower longitudinal rails or bars 162, 194 respectively, extending from end to end of the machine. The links of the chains 181, 182 are provided in their outer edges with notches or sprockets 195 and 183 respectively, those on the upper chains being constructed to receive the trunnions of the plates and those on the lower chains to receive the lower edges of the plates when the plates are transferred from the elevator to said chains in the manner hereinbefore explained. The rails 194 are set at a narrower gage than the rails 162, since the chains 182 come under the ends of the plates while the chains 181 are at the outside edge of the plates. Said chains are preferably provided at their link points with anti-friction rollers which travel in grooves in the respective rails. The sprocket wheels 198 for the upper chains are mounted on short shafts 309; the wheels for said chains are mounted on shafts 205, extending across the machine; and the wheels 199 and 197 for the lower chains are mounted on shafts 310, 210, respectively, also extending across the machine. The shafts 309, 310, have their bearings in brackets 200 affixed to the rails 162, 194, while the shafts 205, 210, have their bearings in the frame of the unloader. Power is applied to the chains 181, 182 at the unloader end of the machine, said chains running idly about the sprockets at the plate elevator end. In the present instance, the shafts 205, 210, are provided with gear wheels 208, 220, respectively, between which are interposed idle gears 209, mounted on studs in the main frame. The shaft 210 carrying the gear 220 bears a bevel spur wheel 211 with which coacts a pinion 212 on the upper end of a shaft 213, the latter shaft bearing at its lower end a bevel gear 214 which engages a similar wheel 214 on the shaft 215 which carries the sprocket wheels 23 hereinbefore referred to. The shaft 215 bears a worm wheel 216 which is geared with a worm 217 on a shaft 218 which extends toward the main shaft 5 and is geared thereto by a gear 219 engaging the gear 20 on said main shaft, (see Fig. 13). Hence power is transmitted from the main shaft to the conveyer chains. It will be obvious that by changing the ratio of pitch of the gears 211, 212, the speed of travel of these chains may be regulated to accommodate any desired number of plates varying from the maximum capacity of the conveyer down to any multiple of links that will register for the timing of the reception and discharge of the plates into and out of the conveyer. Extra sets of these gears may be kept ready for use as climatic conditions may require; the plates as predetermined being taken out during the most efficient drying period. This is obviously an important desideratum in a match machine.

It will be observed that the sprocket wheels 199 for the lower chains are set out from the elevator slightly farther than the wheels 198 for the upper chains, so as to permit the entry of the match plate into the notches 183 of the lower chains, and that in consequence the latter chains become slack on their return travel. To take up or compensate for the slackness, I provide suitable tighteners for the lower chains, said tighteners in the present instance comprising curved bars 201 supported by bars 202 which have an ordinary screw and slot connection with the rails 194 in a manner to provide for vertical adjustment. The chains on their return pass beneath the curved bars, and are properly depressed (see Fig. 1.)

I will now describe the unloader, referring more especially to Figs. 4 and 26 to 42 inclusive, of the drawings. The plates with the matches therein, are conveyed progressively toward the unloader, as above described, and as they approach the latter they are bodily transferred thereto from the conveyer chains. The means preferred for this purpose is of the following construction: 221 (Figs. 26, 27) indicates a pair of angle levers fulcrumed in the frame, at 222, adjacent the delivery portions of the chains 162. The upwardly projecting arms of these levers are appropriately notched or formed at their extremities for engaging the trunnions 2 of each approaching plate and lifting such trunnions from their seats in the chains 181, 182 preparatory to carrying the plate over into the embrace of vertical guides 223 on the unloader frame. The other arms of said levers are connected by means of links 225 to the arms 226 of tri-armed levers 227 (Fig. 38) carried by a shaft 228 having its bearings in suitably-disposed boxes on the main frame. An arm 229 (Fig. 39) of each of the levers 227 is connected by means of a rod 230 with the free end of an arm 231 which is pivoted below the driven shaft 215 previously referred to, and is provided with a roller which engages an appropriate face cam 232 fast on said shaft, whereby the cam, through the connections described, actuates the lever 221 at the proper intervals to engage each plate presented thereto by the drying conveyer and transfer such plate to the unloader.

Secured to the upper part of the unloader frame 207 are inwardl extending flat springs 232 (Figs. 28, 29, 33) which are arranged to press gently on the opposing edges of the plate as it is swung into the unloader, thereby retarding the forward movement of the top of the plate and permitting the advancement of the bottom of the latter to the guides 223. In this operation the trunnions of the plate turn slightly in their seats on the levers 221. The entrance of the lower end of the plate into the guides is positively effected by the action of pushers 233 (Figs. 26, 30, 38) which are pivotally connected to arms 234 of the levers 227, above mentioned, so as to be horizontally reciprocated by the oscillation of said levers. These pushers comprise horizontally disposed members slidingly supported at their outer ends by screws 235 which project from the frame into longitudinal slots 236 in said members. On the inner sides of the members are secured the rearward ends of inclined flat springs 237 which project beyond the free ends of the members, and are bent laterally as indicated to form shoulders 238. The pushers are so arranged that as the plates are carried forward by the conveyer chains the lateral edges of each advancing plate bear against the opposing springs and force them outward until the plate escapes the same, whereupon the springs resume their normal position and the shoulders thereof lie directly in rear of the plate in position to push onward such plate whenever the shaft 228 is oscillated during the plate transferring operation above described. To prevent liability of displacement of the plates in such operation, should the machine be stopped at that time, there are provided in the sides of the unloaded frame, curved guide bars or tracks 239 (Figs. 26, 27, 29, 38) which support the trunnions, and correspond with the arc described by the latter, during the transference of the plate to the unloader.

Suitably-disposed guide pieces 240, 241 secured to the unloader frame direct the edges of the plate during its passage to the guides 223; and snap latches 242, (Figs. 29, 32) similar to a door latch, are arranged adjacent the guide bars so as to snap upon the opposing edges of the plate and secure it within the guides. These latches each comprise a slide bolt guided in a recess adjacent the guide bar 223 and normally projected at one end into the path of the plate by means of a suitably disposed spring X acting against a pin on the bolt. The projecting end of the bolt is beveled to insure its retraction when the plate in its passage to the guide bars bears against said end. The plates are fed down through the unloader by a step-by-step motion, each movement being equal to a space between two or more rows of match perforations as desired. In practice, I prefer to feed, say ten rows at a time and to discharge ten rows of matches at a time.

Respecting the feeding mechanism, 255 (Fig. 37) is a pair of vertical bars, arranged adjacent the respective guides 223, and provided each with a series of pins or studs 256, so positioned as to register with the adjacent row of holes (or sockets) 3 of the plates 1 confined within the guide ways. The bars 255 have pin and slot connection (258) at or near their respective ends with blocks 257 so as to be movable vertically thereon; and these blocks are, in turn, mounted to slide horizontally in grooves in the frame of the unloader. Hence the bars 255 have capacity for both horizontal and vertical movements as required for the purpose of engaging and moving the match plates.

The horizontal movements of the bars are effected as follows: 246 is a shaft having its bearings in suitably arranged boxes on the unloader frame. This shaft has on one end thereof, a bevel gear 250 (Fig. 39) with which co-acts a pinion on the upper end of a vertical shaft 252, the lower end of said shaft bearing a bevel gear 253 driven by a pinion 254 on the shaft 218 before described. On the shaft 247 is a double face cam 260, one of the tracks, 265 of which receives and operates a roller on a pin 266 which connects the long arms of two levers 267, 268 carried by upper and lower rock shafts 269, 270, respectively. The short arms 271, 272, respectively, of these levers are connected by links 273, 274 with the blocks 257 which carry the pin bars 255, (see Figs. 26 and 38). By this construction the cam 260 during the operation of the machine effects, through the connections described, the horizontal motion of the bars 255 so as to move the pins of the latter into and from the holes 3 of the plate at predetermined intervals. The vertical movements of the bars 255 are also produced through the cam 260. The cam track 259 thereof (see Fig. 29) engages a roller on an arm 261 fixed to a rock shaft 262 having its bearings in the main frame. On this shaft are two arms 263 which are connected with the bars 255 by means of links 264, so that as the cam revolves the bars 255 are raised and lowered, the links permitting the before described horizontal movement of the bars.

The timing of the cam tracks 259 and 265 is such that the pin bars 255 move up and then forward so as to register the pins with the holes of the plate. The bars then move down, carrying the plate therewith, and remain with the plate thus lowered, and perforce locked, until and after the ejecting punches have discharged the predetermined rows of matches from the plate. Preparatory to the withdrawal of the punches from the plate the pin bars are again raised and moved into engagement with the next succeeding holes 3 in the plate, whereupon the punches are retracted and the pin bars are lowered to move the plate downward for a succeeding operation of the ejecting punches.

The match ejecting mechanism which I prefer to employ comprises a horizontally reciprocative cross-head 243, provided on its acting face with a plurality of rows of punches 244 corresponding in number and position with the rows of matches to be ejected thereby, and extending through a perforated guide plate 245. The cross-head is guided in a suitably disposed support on the main frame, and is provided at its ends with rollers 249 which engage face cams 246, on the shaft 247, such cams being timed to effect the reciprocations of the punch head in harmony with the operation of the plate feeding and locking devices above described.

The links 264 which connect the pin bars 255 with the arms 263 are preferably provided with ordinary adjusting eye bolts 275 (Fig. 35) by means of which nice adjustment of the pin bars may be effected to insure accurate register of the match plate holes with the discharging punches. The arms 263 at their downward limit of movement rest upon stop studs 276 (Fig. 37) comprising screws arranged in the unloader frame so as to be adjustable to compensate for lost motion of the parts.

The length of the guides 223 exceeds that of any of the match plates delivered thereto and guided therein; and under usual conditions as such plates descend and come in front of the discharging punches the lower edge of one plate rests upon the upper edge of another. In the event however, of a plate being missing (through its prior removal or omission from the machine) it is necessary to provide for the support of the upper descending plate before the plate below it is fed sufficiently to be engaged by the punches, and also to hold the latter plate after it leaves the punches and until it has sufficiently progressed to be engaged by the "sticker" chains. The mechanism for this purpose above the punches, is as follows: 277 represents two corresponding series of stop blocks arranged along the respective guide bars 223 and slidingly fitted to apertures in the latter so as to be movable into and from the ways in which the match plates descend. The blocks are spaced apart the right distance for each step of feeding. During their successive reciprocations into and from the guideways, they engage the trunnions of the descending plates, there being a sufficient number of blocks to hold a plate during each step thereof until it becomes engaged by the discharging punches. The blocks are fixed to vertically arranged bars 278, which are supported by the engagement of the blocks with the apertures and also by angle pieces 279 affixed to the guide bars and to which pieces the bars 278 have a pin and slot connection so as to be movable toward and from the guide bars. The bars 278 are operatively connected with the punch head so as to move simultaneously therewith. In the present instance the connections comprise bars 280 affixed to the ends of the head so as to project above and below the latter. The upper ends of these bars are secured to blocks 302 (Fig. 34) on the end of a connecting cross-bar 281. This cross-bar is connected at its respective ends, by means of links 282, with the depending arms of a pair of tri-armed levers 283 which are fulcrumed to suitably disposed brackets bolted to the guide bars below the bars 278. The upwardly projecting arms of the levers are pivoted to the adjacent bars 278, while the remaining outwardly projecting arms of said levers are connected by means of rods or links 284 to the outwardly projecting arms of angle levers 285 which are fulcrumed to suitably located brackets on the guide bars. The other arms of the angle levers are pivoted to said bars 278 near the upper ends of the latter. By this construction it will be seen that during the reciprocations of the punch head, a similar motion will be simultaneously imparted thereby to the guide bars and their plate supporting blocks for the purpose stated. The depending portions of the bars 280 extend below the punch head to the point at which the empty plates begin to leave the unloader; and such portions are provided on their inner edges with a series of small studs or teeth 286 (Fig. 37) which are so disposed as to engage progressively the proximate empty perforations in the match plates as the latter descend, and thus act to sustain the plates at the punching intervals until such plates are discharged from the unloader.

The body of the frame or member 287 (Fig. 37) in which the punch head is mounted, serves as a back support for the match plates within the guides 223. For a like purpose said frame or member is provided with upwardly and downwardly extending bars 288, 289, respectively.

To counteract the thrust of the punches in their operation of discharging the matches, a bar 312 is arranged to extend across the unloader frame directly in front of the punch mechanism, and is provided with a vertical rib 313, with which the match plates contact at a point on the latter devoid of sticks, namely, the space in line with a partition wall of the feed trough of the sticker. The matches when discharged, as above described, may be received by a suitable packing or boxing machine.

In order to sustain the match plate while the pin bars 255 are being disengaged therefrom at the final step of feeding down the plate, preparatory to discharging it onto the sticker chains, a supporting arm 290 (Figs. 29, 37) having a slight up and down movement correspondingly with the pin bars, is constructed and arranged to take against the side of the plate during such final step. This arm, which is preferably bifurcated to embrace a guide bar 303 therefor affixed to the lower extremities of the bars 289, is carried by one arm of a lever 291 which is loosely mounted between collars on the rock shaft 270 above referred to. The other arm of the lever is connected by means of a link 292 to the cam actuated lever arm 261, which, as hereinbefore explained, is part of the moving mechanism of the pin bars 255. The devices just described are so arranged that when the pin bars are down the arm 290 projects below the supporting bars 289 in a manner to hold back the plate which is about to be discharged while the pin bars are being disengaged therefrom; and that upon the completion of the final upward stroke of the pin bars in respect to said plate, the arm 290 is clear of the top edge of the said plate. The empty plate is fed down by the pin bars until the trunnions 2 rest upon supporting blocks 293 (Figs. 26, 41, 42) fixed to the rails that form part of the sticker guides 11, and mechanism is provided whereby such plate is pulled off the blocks 293 and set into the special links of the "sticker" chains 12 (as seen in Figs. 41, 42) immediately after a filled plate has been transferred from the drying conveyer to the unloader. Said mechanism comprises horizontally extending arms or latches 294 which are connected to angle levers 295 fulcrumed on the frame work, these levers being, in turn, connected by means of links 296 with arms 297 of the tri-armed rock levers 227, hereinbefore particularly described. Thus the latches are longitudinally reciprocated. The free ends of the latches are provided with lateral projections 311 which extend between the main frame and the blocks 293 in position to engage the ends of the trunnions supported in the latter and thereby to shift the trunnions from the blocks to the "sticker" chains.

Fixed to the main frame, directly below the unloader, are angular bars 298, which are so located that when the empty plate is supported by the blocks, as just explained, the lower edge of the plate is in contact with the vertical limbs of said bars. The bars thus afford a temporary stop for the proximate edge of the plate, and hence when the plate is pulled from the blocks by the latches the upper edge of the plate is caused to swing sufficiently inward to allow clearance for the pin bars 225 in their descent during the next interval of feeding. As the plate is carried toward the sticker the lower edge of the plate rides upon the horizontal limbs of the bars 298, these limbs being sufficiently long to maintain said plate in a vertically-inclined position until it is far enough away from the "unloader" to be free to revolve to a horizontal position on its trunnions as an axis.

At suitable points on the sticker guides 11, is arranged a pair of curved abutment pieces 299, against which the plate bears as it reaches the ends of the bars, 298, which pieces, as the plate is advanced, press over and downward the opposing portion of the plate until the latter is caused to assume a horizontal position preparatory to its passage to the sticker. I preferably provide on the under side of the guide bars 11 inclined blocks 300 which are so disposed as to receive the forward edges of the plates as they approach the sticker mechanism, and thus direct the plates positively to a horizontal position to insure their proper entrance to such mechanism. This completes the entire operation of the machine.

From the foregoing, it will be seen that the various mechanisms constituting the organized machine, being positively timed and being operative at all times independently of the match carriers, permit said carriers to be removed at will, or some omitted, as occasion may require, without in any case disturbing the harmonious operation of the machine. Thus, free access to all the parts may be readily had without trouble, delay or liability of accident. It will also be seen that the arrangement of the carriers in the drying conveyer, as shown, whereby each plate is entirely free from its neighbor, minimizes the liability of fire spreading from one carrier to the next; and at the same time, enables a fire occurring in a carrier or carriers, to be readily extinguished without injury to matches in carriers adjacent to those on fire. Moreover, the vertical arrangement of the plates in the drying conveyer allows the utilization of more match carriers and a corresponding increase of matches in a given space than is possible in automatic match machines of prior constructions.

What I claim is—

1. In a match machine, the combination with splint supplying mechanisms, splint dipping mechanism, and match ejecting mechanism, of separate and independent match carriers, and means for impelling said carriers to and past the said mechanisms in succession, said means including devices for feeding the carriers end to end across the said supplying and dipping mechanisms, and also devices for feeding the carriers through a drying space, side by side, preparatory to their passage to the said ejecting mechanism.

2. In a match machine, the combination of separate and independent match carriers, mechanism for supplying splints row by row to said carriers, mechanism for applying composition to said splints, means for impelling said carriers to and past the said mechanisms, a drying conveyer to support said carriers in upright position side by side, means for transferring the carriers to the said conveyer, match ejecting mechanism, and means for transferring the carriers thereto from the drying conveyer.

3. In a match machine, the combination with splint supplying mechanism, splint dipping mechanism, and match ejecting mechanism, of separate and independent match carriers, and means for impelling said carriers to and past the said mechanisms in succession, said means including a set of chains for impelling the carriers through the supplying mechanism, a set of chains for impelling the carriers through the dipping mechanism, a set of chains for elevating the carriers, a set of chains for receiving the carriers and conducting them in upright position side by side through a drying space, and devices for feeding the carriers to and past the ejecting mechanism.

4. In a match machine, the combination of independent match carriers, traveling supports therefor, elevating mechanism, means whereby said carriers are successively removed from the said supports and engaged with said elevating mechanism, a drying conveyer having means to receive and support said carriers in upright position, and means whereby the carriers are successively removed from the elevating mechanism and transferred to the drying conveyer.

5. In a match machine, the combination of independent match carriers, traveling supports therefor, elevating mechanism, means whereby said carriers are successively removed from the said supports and engaged with said mechanism, a drying conveyer having means to receive and support said carriers in upright position, means whereby the carriers are successively removed from the elevating mechanism, and transferred to the drying conveyer, match ejecting mechanism, and means whereby the said carriers are transferred from the drying conveyer to the ejecting mechanism.

6. In a match machine, the combination of independent match carriers, traveling devices upon which they are supported, splint supplying and splint dipping mechanisms through which the said carriers are progressively advanced end to end by said devices, elevator mechanism intersecting the path of said devices and having means to engage the said carriers successively and lift them pivotally from said devices, and means whereby the said carriers are swung into upright position upon the elevator mechanism from the said devices.

7. In a match machine, the combination with independent match carriers, of a plurality of sets of chains provided each with carrier engaging portions at predetermined intervals which detachably support the carriers, sprocket wheels for said chains, actuating mechanism for said wheels, said chains being so arranged that during their travel the carrier engaging portions of one set will pass laterally in proximity to those of another set and thus effect the bodily transference of the carriers from one set of chains to another, elevator mechanism for engaging and raising said carriers, and means for removing the said carriers from the elevator mechanism and disposing them in upright position.

8. In a match machine, the combination with independent match carriers provided with projecting portions, of a plurality of sets of chains provided each with links having open-mouth notches to receive said portions, sprocket wheels for said chains, actuating mechanism for said wheels, said sets of chains being arranged to travel laterally in proximity to each other, whereby during their traverse the notched links of one set will progressively register with those of another set and effect the bodily transference of the carriers from one set of chains to another, elevator mechanism for engaging and raising said carriers, and means for removing the said carriers from the elevator mechanism and disposing them in upright position.

9. In a match machine, a set of parallel chains provided at predetermined intervals with links having open-mouth notches, and means for supporting and impelling said chains, in combination with match carriers provided with trunnions detachably seated in the notches of said links, and another set of parallel chains provided also with notched or recessed links, at intervals, the said latter chains crossing the path of the first-named chains so as to receive the trunnions of the carriers and disengage them from the first-named chains.

10. In a match machine, the combination with traveling plate supporting devices having open-mouth notches at intervals apart, of match carrier plates provided on their edges with trunnions seated in the notches of said devices, and other traveling plate-supporting devices having open-mouthed notches which, in their traverse, cross the path of the devices first-named and receive the trunnions of the carrier plates.

11. In a match machine, the combination of traveling plate-supporting devices having open-mouthed notches, match carrier plates provided with trunnions seated in the notches of said devices, other traveling plate-supporting devices having open-mouthed notches, which in their traverse cross the path of the devices first named and receive the trunnions of the carrier plates, and a stationary cam against which the said plates abut and by which they are partially raised preparatory to their engagement by such other devices.

12. In a match machine, the combination with dipping or composition-applying mechanism, of a match carrier, means for axially supporting the same and impelling it across said devices, and means for thereafter turning said carrier a complete revolution on its axis while the composition on the matches in said carrier is soft, so as thereby to impart a good shape to the match heads.

13. In a match machine, the combination with independent match carriers, of traveling devices having pivot-supports in which the said carriers are seated, and oscillatory means engaging the faces of said carriers beyond the pivot supports so as to rotate the carriers.

14. In a match machine, the combination with independent match carriers, of traveling devices having pivot-supports in which the said carriers are seated, an arm adapted to engage the said carriers successively at points beyond the pivot-supports, and means for oscillating said arm to effect the rotation of the engaged carrier.

15. In a match machine, the combination with elevator mechanism, of means for delivering independent match carriers successively thereto in horizontal position, and means for revolving said carriers into vertical position on said elevating mechanism.

16. In a match machine, the combination with elevator mechanism, of means for delivering independent match carriers successively thereto in horizontal position, means for tilting said carriers as they are being raised by said mechanism, and stop devices arranged to engage one end of each tilted carrier and effect its rotation to a vertical plane as the elevation of the carriers proceeds.

17. In a match machine, the combination with elevator mechanism including chains provided at intervals with notched or open links, of match carriers provided with trunnions, means for delivering said carriers to the elevator mechanism so that the trunnions of the plates will be seated in the sockets of the chain links and rotative bearings for the plates thus be afforded, and means whereby said plates are rotated on their bearings into parallelism with the said chains during the upward travel of the latter.

18. In a match machine, the combination with an elevator, of independent match carriers carried thereby in a vertical plane, a drying conveyer at the summit of the elevator, and means for successively removing said carriers from the elevator and setting them in upright position, at intervals apart, upon the drying conveyer.

19. In a match machine, the combination with an elevator, of independent match carriers carried thereby in a vertical plane, a drying conveyer at the summit of the elevator, devices adapted to engage the successive carriers at points between their ends and set them in upright position upon the conveyer, and means to engage the tops of the carriers and support and steady them during the operation of said devices.

20. In a match machine, the combination with an elevator mechanism including chains, and vertical guideways having movable guide pieces near their upper ends, of independent match carriers carried by said chains in a vertical plane, a drying conveyer at the summit of the elevator, means for successively removing said carriers from the elevator chains and setting them in upright position, at intervals apart, upon the drying conveyer, and means for operating said movable guide pieces to permit the exit of the carriers from the elevator.

21. In a match machine, the combination with an elevator, of independent match carriers carried thereby in upright position, means for successively discharging said carriers in upright position from the elevator, and a receiver for the carriers thus discharged.

22. In a match machine, the combination with match carriers, traveling devices upon which they are supported, splint supplying and splint dipping mechanisms through which the said carriers are progressively advanced in horizontal position by said devices, elevating mechanism succeeding the dipping mechanism and having provisions to engage and lift the carriers successively from the said traveling devices, and means whereby the carriers are revolved into vertical position on said elevating mechanism.

23. In a match machine, the combination of a drying conveyer having means for supporting filled match carriers in upright position, and means for supplying said carriers to the conveyer.

24. In a match machine, the combination of a drying conveyer having means for supporting filled match carriers in upright position, and means for removing said carriers from the conveyer.

25. In a match machine, the combination of a drying conveyer having means for supporting filled match carriers in upright position, means for supplying said carriers to the conveyer, and means for removing them from the conveyer.

26. In a match machine, the combination of a drying conveyer having means for supporting filled match carriers in upright position, mechanism for discharging the matches from said carriers, and means for transferring the carriers from the conveyer to said mechanism.

27. In a match machine, a drying conveyer comprising upper and lower chains having provisions to receive and support match carriers in upright position, at intervals apart, and actuating means for said chains.

28. In a match machine, a drying conveyer comprising upper and lower chains having provisions to receive and support match carriers in upright position, at intervals apart, actuating mechanism for said chains, and parallel rails upon which said chains are supported.

29. In a match machine, the combination with match carriers provided with trunnions or projections on their lateral edges, of a drying conveyer comprising upper and lower chains provided each with notches or sockets at intervals apart, the notches or sockets of the said upper and lower chains being adapted to receive the trunnions and lower edges, respectively, of the match carriers, together with actuating mechanism for the said chains.

30. In a match machine, the combination of a drying conveyer having means for supporting filled match carriers in upright position, means for supplying said carriers to the conveyer, mechanism for discharging the matches from said carriers, and means for transferring the carriers from the conveyer to said mechanism.

31. In a match machine, the combination with independent match carriers, of a drying conveyer by means of which said carriers are fed continuously along side by side in upright position, means for ejecting the matches from said carriers, feed devices for intermittently moving the carriers across the path of the ejecting mechanism, and means whereby the carriers are successively transferred from the conveyer to said feed devices.

32. In a match machine, the combination with independent match carriers, of means for continuously feeding them at one portion of their traverse side by side in upright position through a drying path, means for intermittently feeding them at another portion of their traverse, edge to edge in the same plane and means for transferring the carriers from one feeding means to another.

33. In a match machine, the combination with a match carrier comprising perforated plates, of mechanism for cutting match splints and inserting them row by row into the perforations of said plates, said mechanism being a sufficient distance from the ends of the splints to be inserted into the carrier to permit such ends to move with the carrier, mechanism for dipping said splints, and reciprocating punches for ejecting the matches from said plates, of means for impelling the said plates edge to edge in the same plane to and past the said mechanisms, successively, said means including devices to move the plates continuously to and past the said cutting and inserting mechanisms, and devices to move said plates intermittently across the path of the reciprocating punches together with means for receiving and carrying the said plates side by side in upright position through a drying path between the said mechanisms and the devices last-named.

34. In a match machine, the combination of a drying conveyer, independent match carriers supported thereon in upright position, mechanism for discharging the matches from the carriers, and means for successively transferring said carriers from the conveyer to the discharging mechanism.

35. In a match machine, the combination of a drying conveyer, independent match carriers supported thereon in upright position, devices to engage the successive carriers and remove them from said conveyer, punching mechanism for ejecting the matches from the carriers, and means for progressively feeding said carriers to and across the path of the punching mechanism.

36. In a match machine, the combination of a drying conveyer, independent match carriers supported thereon in upright position, devices to engage the successive plates at points between their ends and remove them from the conveyer, means for advancing the lower ends of said carriers during their removal, guides to receive said carriers, thus removed, match ejecting mechanism, and means for progressively feeding said carriers to and across the path of said mechanism.

37. In a match machine, the combination with match carriers provided with projections on their lateral edges, of means for feeding said carriers along side by side in upright position, means for successively receiving said carriers in upright position and intermittently feeding them downward, a series of stop devices spaced apart correspondingly with the steps of the feeding and movable at intervals into and from the path of said projections during the progress of the carriers, and means for operating said devices in alternation with the feeding means together with means for discharging the matches from said carrier during the intermissions of feeding.

38. In a match machine, the combination with a match carrier, and means for feeding it in upright position in a horizontal path, of mechanism for receiving said carrier and feeding it downward in upright position, said mechanism comprising a bar or bars, provided with points for engaging the carrier, supports movable toward and from the carrier, connections between the said bar or bars and the supports, whereby the bar or bars are movable at right angles to the movement of said supports, cam mechanism and link connections between the same and the bar or bars, whereby said bar or bars are moved to and from the carrier and forward and back along the path of travel of the carrier.

39. In a match discharging mechanism, the combination with a punch bearing head, guideways for directing a match carrier in the path of the punches, a shaft, and operative connections between the same and the head, of feed mechanism for the carrier, comprising a bar or bars arranged in parallelism to said guides and movable both longitudinally and transversely in respect to the carrier, a cam on said shaft, and connections between said cam and said bar or bars.

40. In a match machine, the combination with a drying conveyer, independent match carriers supported thereon in upright position, devices to engage the successive carriers and remove them from the conveyer, match ejecting mechanism, means for intermittently feeding the carriers thereto, and auxiliary stop devices for intermittently engaging and supporting the carriers during their intermittent travel.

41. In a match machine, the combination with a drying conveyer, independent match carriers supported thereon in upright position, and devices for engaging successive carriers and removing them from the conveyer of ejecting devices, and mechanism for feeding said carriers intermittently to and across the path of said devices, said mechanism comprising a bar or bars provided with carrier engaging devices, and means for moving said bar or bars to and from the carriers, and also reciprocating the bar or bars longitudinally of the carriers.

42. In a match machine, the combination with a match carrier plate, match ejecting mechanism, and means for intermittently feeding said plate downwardly and across the path of said mechanism, of a plate supporting device, and connections between the same and the feeding means whereby the said device is moved by the feeding means into position to engage and support the upper portion of the plate preparatory to the final action of the feeding means on said plate.

43. In a match machine, the combination with a match carrier plate, match ejecting mechanism, and means for intermittently feeding said plate downwardly and across the path of said mechanism, of a reciprocating member co-acting with the upper portion of the descending plate to support it preparatory to the final action of the feed means thereon, and lever and link connections between said member and the feeding means whereby the said member is reciprocated vertically.

44. In a match machine, the combination of splint supply mechanism, independent match carriers, traveling chains for impelling said carriers to and past the said supply mechanism, means for transporting the filled carriers in upright position side by side, devices for delivering the carriers thereto, match discharging mechanism, devices for delivering the carriers to said discharging mechanism and means whereby the carriers are delivered therefrom onto said chains.

45. In a match machine, the combination with independent match carriers and mechanism for ejecting the matches therefrom, of means for intermittently feeding said carriers past the ejecting mechanism, splint-supply mechanism, and means for continuously feeding to and past the last-named mechanism the empty carriers delivered from the ejecting mechanism, together with means for transporting the filled carriers in upright position side by side, devices for delivering the carriers to said transporting means, and means for transferring the carriers therefrom to the ejecting mechanism.

46. In a match machine, the combination with independent match carriers, match discharging mechanism, and means for feeding said carriers downwardly past and beyond said mechanism, of traveling devices upon which the empty carriers are deposited and pivotally supported, and means for revolving said carriers into a horizontal plane on said devices said means including a stationary abutment arranged in the path of the carriers.

47. In a match machine, the combination with independent match carriers, match discharging mechanism, and means for feeding said carriers downwardly past and beyond said mechanism, of traveling devices upon which the empty carriers are deposited and pivotally supported, means for revolving said carriers into a horizontal plane on said devices, and splint supplying mechanism across the path of which said carriers are impelled by said devices said means including a stationary abutment arranged in the path of the carriers.

48. In a match machine, the combination with splint supply mechanism, independent match carriers provided with trunnions and traveling chains provided with means to receive and support said trunnions, and to impel said carriers in a horizontal plane to and past the supply mechanism, of match discharging mechanism, means whereby the carriers are delivered therefrom in a vertical plane and the trunnions seated in the chains, and means whereby the carriers are swung to a horizontal plane on said chains.

49. In a match machine, the combination with match carriers, and mechanism for discharging matches therefrom, of horizontally traveling devices upon which said carriers are pivotally seated as they leave the discharging mechanism, and means including a stationary abutment arranged in the path of the carrier for swinging said carriers into horizontal position on said traveling devices.

50. In a match machine, the combination with match carriers, and mechanism for discharging matches therefrom, of horizontally traveling chains, supports adjacent thereto for the said carriers as they leave the discharging mechanism, means for moving said carriers from the supports into pivotal connection with the chains, said carriers and chains having means for their pivotal connections, and means whereby the carriers are swung into horizontal position while on said chains.

51. In a match machine, the combination with a match carrier provided with trunnions, horizontally traveling chains provided with means to receive and support said trunnions, means whereby the carrier is delivered vertically to said chains, a stop device in the path of the lower end of said carrier, whereby the latter as it is advanced by said chains is turned on its trunnions to an inclined position, and other stop devices for thereafter turning said carrier to a horizontal position.

52. In a match machine, the combination with separate and independent match carriers, a source of splint supply therefor, and dipping means, of mechanism for continuously moving said carriers across the paths of the source of supply and dipping means, means for elevating said carriers, and means for conducting said carriers through a drying space in upright position side by side.

53. In a match machine, the combination with separate and independent match carriers, a source of splint supply therefor, and dipping means, of mechanism for continuously moving said carriers across the paths of the source of supply and dipping means, means for elevating said carriers, means for conducting said carriers through a drying space in upright position side by side, and means for discharging the matches from the carriers.

54. In a match machine, the combination with separate and independent match carriers, a source of splint supply therefor, and dipping means, of mechanism for continuously moving said carriers across the paths of the source of supply and dipping means, means for elevating said carriers, means for conducting said carriers through a drying space in upright position side by side, means for discharging the matches from the carriers, and means for returning the empty carriers to the said mechanism.

55. In a match machine, the combination with separate and independent match carriers, a source of splint supply therefor, and dipping means, of mechanism for continuously moving said carriers across the paths of the source of supply and dipping means, means for elevating said carriers, and means for continuously moving said carriers through a drying space in upright position side by side.

56. In a match machine, the combination with separate and independent match carriers, a source of splint supply therefor, and dipping means, of mechanism for continuously moving said carriers across the paths of the source of supply and dipping means, means for elevating said carriers, means for continuously moving said carriers through a drying space in upright position side by side, and means for discharging the matches from the carriers.

57. In a match machine, the combination with separate and independent match carriers, a source of splint supply therefor, and dipping means, of mechanism for continuously moving said carriers across the paths of the source of supply and dipping means, means for elevating said carriers, means for continuously moving said carriers through a drying space, in upright position, side by side means for discharging matches from the carrier and means for returning the empty carriers to the said mechanism.

In witness whereof, I have hereunto set my hand at the city of Chicago, this 11th day of June, 1903.

WILLIAM ERASTUS WILLIAMS.

Witnesses:
   J. W. WRAITH,
   G. W. COULON.